(12) United States Patent
Aggarwal et al.

(10) Patent No.: US 11,657,306 B2
(45) Date of Patent: May 23, 2023

(54) FORM STRUCTURE EXTRACTION BY PREDICTING ASSOCIATIONS

(71) Applicant: Adobe Inc., San Jose, CA (US)

(72) Inventors: Milan Aggarwal, San Jose, CA (US); Mausoom Sarkar, San Jose, CA (US); Balaji Krishnamurthy, San Jose, CA (US)

(73) Assignee: Adobe Inc., San Jose, CA (US)

( * ) Notice: Subject to any disclaimer, the term of this patent is extended or adjusted under 35 U.S.C. 154(b) by 212 days.

(21) Appl. No.: 16/904,263

(22) Filed: Jun. 17, 2020

(65) Prior Publication Data

US 2021/0397986 A1 Dec. 23, 2021

(51) Int. Cl.
*G06N 5/04* (2023.01)
*G06N 20/00* (2019.01)
*G06N 3/08* (2023.01)
*G06V 10/82* (2022.01)
*G06N 20/10* (2019.01)

(52) U.S. Cl.
CPC .............. *G06N 5/04* (2013.01); *G06N 3/08* (2013.01); *G06N 20/00* (2019.01); *G06N 20/10* (2019.01); *G06V 10/82* (2022.01)

(58) Field of Classification Search
CPC ............ G06N 5/04; G06N 20/10; G06N 3/08; G06V 10/82
See application file for complete search history.

(56) References Cited

U.S. PATENT DOCUMENTS

| 8,606,724 B2* | 12/2013 | Cheng | G06N 20/00 706/45 |
| 10,198,671 B1* | 2/2019 | Yang | G06K 9/6274 |
| 2008/0091408 A1* | 4/2008 | Roulland | G06F 40/211 707/E17.074 |

(Continued)

OTHER PUBLICATIONS

Audebert et al., Multimodal Deep Networks for Text and Image-based Document Classification, arXiv preprint arXiv:1907.06370, Available Online at: https://arxiv.org/abs/1907.06370, Jul. 15, 2019, 8 pages.

(Continued)

*Primary Examiner* — Scott C Anderson
(74) *Attorney, Agent, or Firm* — Kilpatrick Townsend & Stockton LLP

(57) ABSTRACT

Techniques described herein extract form structures from a static form to facilitate making that static form reflowable. A method described herein includes accessing low-level form elements extracted from a static form. The method includes determining, using a first set of prediction models, second-level form elements based on the low-level form elements. Each second-level form element includes a respective one or more low-level form elements. The method further includes determining, using a second set of prediction models, high-level form elements based on the second-level form elements and the low-level form elements. Each high-level form element includes a respective one or more second-level form elements or low-level form elements. The method further includes generating a reflowable form based on the static form by, for each high-level form element, linking together the respective one or more second-level form elements or low-level form elements.

19 Claims, 13 Drawing Sheets

(56) References Cited

U.S. PATENT DOCUMENTS

| | | | |
|---|---|---|---|
| 2008/0259079 A1* | 10/2008 | Boxman | G06T 15/08 345/424 |
| 2019/0050640 A1* | 2/2019 | Sarkar | G06K 9/6269 |
| 2019/0171726 A1* | 6/2019 | Ahmed | G06F 16/9535 |
| 2019/0286691 A1* | 9/2019 | Sodhani | G06N 3/0445 |

OTHER PUBLICATIONS

Bahdanau et al., Neural Machine Translation by Jointly Learning to Align and Translate, arXiv preprint arXiv:1409.0473, Available Online at: https://arxiv.org/abs/1409.0473, May 2016, pp. 1-15.

Bojanowski et al., Enriching Word Vectors with Subword Information, arXiv preprint arXiv:1607.04606, vol. 5, Jun. 19, 2017, pp. 135-146.

Chen et al., Encoder-Decoder with Atrous Separable Convolution for Semantic Image Segmentation, Computer Vision—ECCV, Oct. 6, 2018, pp. 833-851.

Drivas et al., Page Segmentation and Classification Utilizing Bottom-Up Approach, Proceedings of 3rd International Conference on Document Analysis and Recognition, vol. 2, Aug. 1995, 2 pages.

Ha et al., Document Page Decomposition by The Bounding-Box Project, Proceedings of 3rd International Conference on Document Analysis and Recognition, vol. 2, IEEE, Aug. 1995, pp. 1119-1122.

Ha et al., Recursive X-Y Cut Using Bounding Boxes of Connected Components, Proceedings of 3rd International Conference on Document Analysis and Recognition, vol. 2, Aug. 1995, pp. 952-955.

Hao et al., A Table Detection Method for PDF Documents Based on Convolutional Neural Networks, 2016 12th IAPR Workshop on Document Analysis Systems (DAS), Apr. 2016, 3 pages.

He et al., Multiscale Multi-task FCN for Semantic Page Segmentation and Table Detection, 2017 14th IAPR International Conference on Document Analysis and Recognition (ICDAR), 2017, pp. 254-261.

Hochreiter et al., Long Short-Term Memory, Neural Computation, vol. 9, No. 8, Nov. 1997, pp. 1735-1780.

Howard et al., Mobilenets: Efficient Convolutional Neural Networks for Mobile Vision Applications, arXiv preprint arXiv:1704.04861, Available Online at: https://arxiv.org/abs/1704.04861, Apr. 17, 2017, pp. 1-9.

Huang et al., Bidirectional LSTM-CRF Models for Sequence Tagging, Computer Science, arXiv:1508.01991 [cs.CL], Available Online at: https://arxiv.org/abs/1508.01991, Aug. 9, 2015, 10 pages.

Jaume et al., Funsd: A Dataset for Form Understanding in Noisy Scanned Documents, arXiv preprint arXiv:1905.13538, Available Online at: https://arxiv.org/abs/1905.13538, Oct. 29, 2019, 6 pages.

Katti et al., Chargrid: Towards Understanding 2D Documents, arXiv preprint arXiv:1809.08799, Available Online at: https://arxiv.org/abs/1809.08799, Sep. 24, 2018, 11 pages.

Kingma et al., Adam: A Method for Stochastic Optimization, arXiv preprint arXiv:1412.6980, Available Online at: https://arxiv.org/abs/1412.6980, 2014, 15 pages.

Kolsch et al., Recognizing Challenging Handwritten Annotations with Fully Convolutional Networks, 2018 16th International Conference on Frontiers in Handwriting Recognition (ICFHR), Jun. 22, 2018, 7 pages.

Lebourgeois et al., A Fast and Efficient Method for Extracting Text Paragraphs and Graphics from Unconstrained Documents, Proceedings 11th IAPR International Conference on Pattern Recognition. vol. II. Conference B: Pattern Recognition Methodology and Systems, Sep. 1992, pp. 272-276.

Liu et al., Graph Convolution for Multimodal Information Extraction From Visually Rich Documents, arXiv preprint arXiv:1903.11279, Mar. 27, 2019, 8 pages.

Long et al., Fully Convolutional Networks for Semantic Segmentation, Proceedings of the IEEE conference on computer vision and pattern recognition, Mar. 8, 2015, pp. 3431-3440.

Qasim et al., Rethinking Table Parsing Using Graph Neural Networks, arXiv preprint arXiv:1905.13391, Jul. 3, 2019, 6 pages.

Riba et al., Table Detection in Invoice Documents by Graph Neural Networks, 2019 International Conference on Document Analysis and Recognition (ICDAR), Sep. 2019, 6 pages.

Sermanet et al., Overfeat: Integrated Recognition, Localization and Detection Using Convolutional Networks, arXiv:1312.6229 [cs.CV], Available Online at: https://arxiv.org/abs/1312.6229, 2013, pp. 1-16.

Sicre et al., Identity Documents Classification as an Image Classification Problem, International Conference on Image Analysis and Processing, Apr. 27, 2017, pp. 602-613.

Siegel et al., Extracting Scientific Figures with Distantly Supervised Neural Networks, Proceedings of the 18th ACM/IEEE on joint conference on digital libraries, May 30, 2018, pp. 223-232.

Simon et al., A Fast Algorithm for Bottom-Up Document Layout Analysis, IEEE Transactions on Pattern Analysis and Machine Intelligence, vol. 19, No. 3, Mar. 1997, pp. 273-277.

Sinha et al., Attention Based Natural Language Grounding by Navigating Virtual Environment, 2019 IEEE Winter Conference on Applications of Computer Vision (WACV), 2018, pp. 236-244.

Sutskever et al., Sequence to Sequence Learning with Neural Networks, Advances in Neural Information Processing Systems, Sep. 10, 2014, pp. 3104-3112.

Wick et al., Fully Convolutional Neural Networks for Page Segmentation of Historical Document Images, 2018 13th IAPR International Workshop on Document Analysis Systems (DAS), Feb. 15, 2018, pp. 287-292.

Wigington et al., Start, Follow, Read: End-to-end Full-page Handwriting Recognition, Proceedings of the European Conference on Computer Vision (ECCV), 2018, pp. 367-383.

Williams et al., A Learning Algorithm for Continually Running Fully Recurrent Neural Networks, Neural Computation, vol. 1, No. 2, Jun. 1989, pp. 270-280.

Yang et al., Hierarchical Attention Networks for Document Classification, Proceedings of the 2016 Conference of the North American Chapter of the Association for Computational Linguistics: Human Language Technologies, Jun. 2016, pp. 1480-1489.

Yang et al., Learning to Extract Semantic Structure from Documents Using Multimodal Fully Convolutional Neural Networks, Proceedings of the IEEE Conference on Computer Vision and Pattern Recognition, Jul. 2017, pp. 5315-5324.

* cited by examiner

FORM STRUCTURE EXTRACTION BY PREDICTING ASSOCIATIONS

TECHNICAL FIELD

This disclosure generally relates to document structure extraction. More specifically, but not by way of limitation, this disclosure relates to predicting associations between form structures and using such associations for form structure extraction, such that extracted form structures are useable to convert a static form to a reflowable form.

BACKGROUND

Forms are documents that are widely used to acquire information from people across different domains, such as health care, administration, and financial systems. Businesses and governments are moving toward providing documents, such as forms, digitally and preferably in a manner that enables mobile consumption of such documents. This can be problematic when certain forms or other documents of such organizations have been provided in paper format historically, and now an organization wishes to provide such forms digitally to enable indexing or wider accessibility for internal use as well as to provide seamless digital experiences. If a form is digitized, the form can be used on a computing device rather than solely on paper. This availability across devices automatically increases the ease of doing business or providing services because people can interact with the form more easily. Additionally, form digitization enables capabilities such as better handling of data filled into a digitized version, applying validation checks on data filled in fields, consistent form design control, and auto-filling similar fields.

A significant issue with digitizing forms, however, is the large range of computing devices that users might use to access a digital form. If a form is digital but static (i.e., not reflowable), then a form page does not change or adapt based on the size or resolution of a display screen used to view the form on a computing device. As a result, the form may be difficult or impossible to use, for instance, as might be the case in a complex form on an 8.5-by-11-inch page that is viewed on a low-resolution display screen. To address this potential issue, organizations seek to make their forms reflowable, which can involve converting paper-based or other static forms to reflowable forms.

Currently, organizations hire content authors to manually replicate a static form that is paper-based or digital. A form includes various data fields, each of which provides information to a user or accepts data input. A content author builds a reflowable experience that is mobile-ready one data field at a time, based on the fields in the static form, to provide a reflowable form that provides a similar experience and gathers similar information as does the static form. The end result is a digital, reflowable form that can be viewed and used across various devices having various screen sizes.

SUMMARY

Techniques described herein extract form structures from a static form to facilitate making that static form reflowable. A method described herein performed by an extraction system includes accessing low-level form elements extracted from a static form. In one example, a computing system performs optical character recognition on the static form to determine the low-level form elements, which are textruns and widgets. The method further includes determining second-level form elements based on the low-level form elements, through using a first analytics engine that includes a first set of prediction models trained to determine associations between the low-level form elements. Each second-level form element includes a respective one or more low-level form elements. In this example, the computing system uses a series of prediction models that were trained end to end and, with such prediction models, determines textblocks of the static form. Each textblock includes a combination of textruns.

The method further includes determining high-level form elements based on the second-level form elements and the low-level form elements, through using a second analytics engine that includes a second set of prediction models trained to determine associations. Each high-level form element includes a respective one or more second-level form elements or low-level form elements. In this example, the computing system uses another series of prediction models, which were previously trained end to end, to group textblocks and widgets into textblocks, text fields, choice groups, and choice fields. The method further includes generating a reflowable form based on the static form by, for each high-level form element, linking together the respective one or more second-level form elements or low-level form elements. In this example, for each textblock, text field, choice group, or choice field, the computing system links together the textruns and widgets therein. Due to such linkages, when the various form elements are embedded into a reflowable form, the reflowable form can be reflowed while maintaining the spatial relationships between textruns and widgets within a common textblock, text field, choice group, or choice field.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 shows an example of low-level form elements in a static form, according to some embodiments described herein.

FIG. 3 shows an example of high-level form elements in the static form of FIG. 2, according to some embodiments described herein.

DETAILED DESCRIPTION

Figure 1:
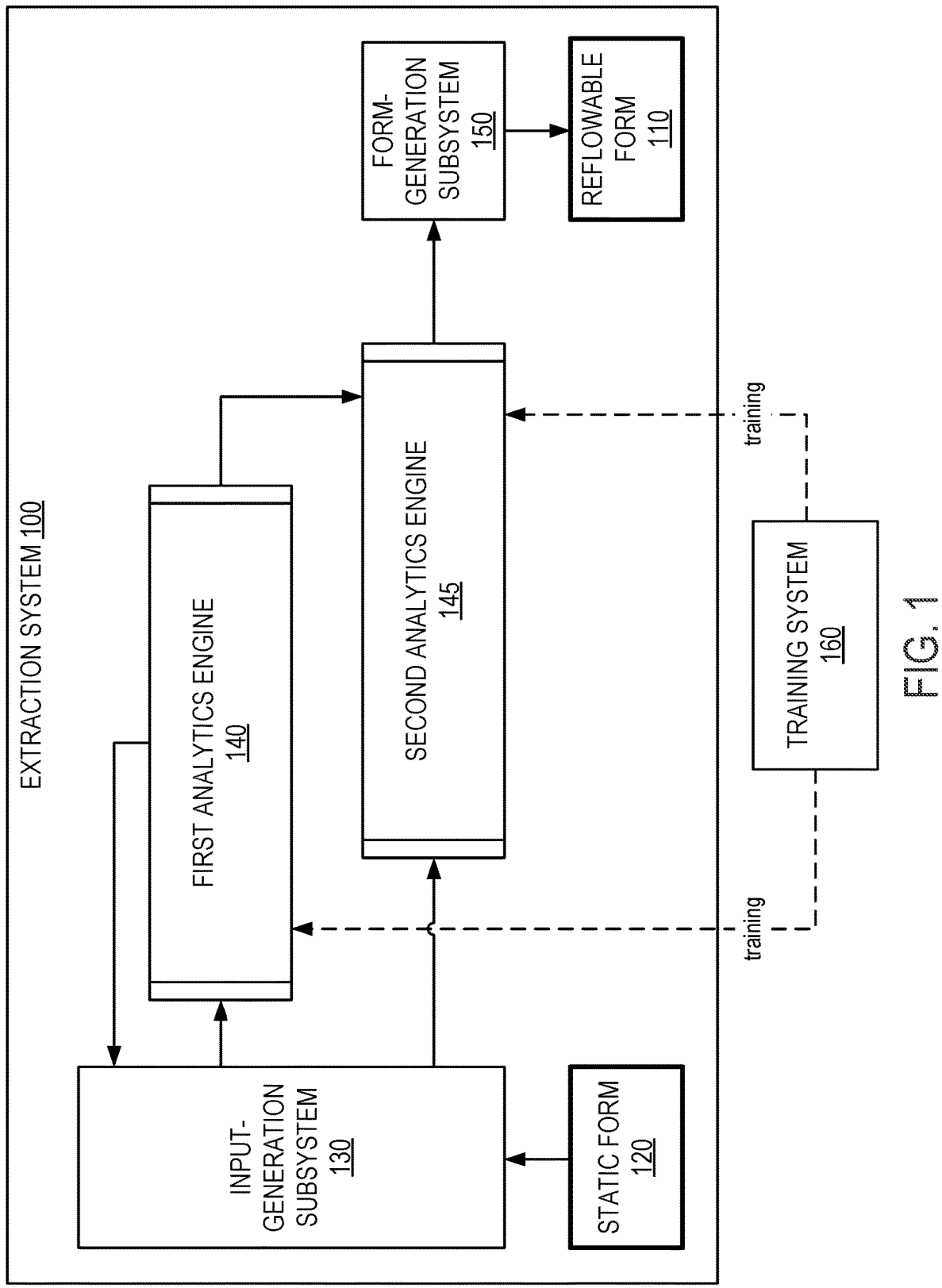
FIG. 1 is a diagram of an example of an extraction system configured to extract form structures from a static form and thereby facilitate construction of a reflowable form, according to some embodiments described herein.

The present disclosure includes techniques for extracting form elements, also referred to as form structures, from a static form, such as to facilitate conversion of the static form to a reflowable form. As explained above, conventional techniques require manual intervention from a content author, who manually replicates form fields of a static form to create a reflowable form. This process is time consuming, expensive, and dependent on technical skill. Further, this process leaves room for manual error.

Document structure extraction has been studied extensively, with recent techniques employing deep-learning-based fully convolutional neural networks. These techniques extract document structures through semantic segmentation performed over a document image. Such techniques perform well at extracting relatively coarse structures, rather than dense or detailed structures such as those in forms. Segmentation techniques generally extract structures for an entire page in a single forward pass. Due to memory constraints, however, segmentation techniques downscale an original image before providing that original image to a prediction model. As a result, some form structures end up merged because downscaling makes it difficult to disambiguate closely spaced structures. This leads to coarse forms structures that cause certain portions of the form to stick together even though such portions are not closely related. The resulting form does not reflow well because large portions of the form are stuck together unnecessarily.

Certain embodiments described herein improve on these techniques by automatically identifying form elements and determining logical associations between such elements to ensure that associated form elements remain together during reflowing, without requiring that unrelated form elements remain together. Certain embodiments automate the determination of groups of form elements that should stay together and, as such, enable reflowing of a form. To this end, some embodiments described herein digitize a form, such as by converting the form to Portable Document Format (PDF) or Acroforms with information about low-level form elements such as textruns and widgets. For instance, optical character recognition (OCR) some other digitizing technique may be used to identify low-level form elements. Some embodiments then use a multi-modal technique, which utilizes two sets of prediction models, to group the low-level form elements into high-level form elements that are more complex. These high-level form elements include, for instance, textblocks, text fields, choice groups, and choice fields.

Generally, a form or form page (i.e., a page of a form) includes textruns and widgets as its smallest constituent elements, which are referred to herein as low-level form elements. Widgets are data fields (e.g., editable spaces) provided to enable a user to fill information. A widget may include text that describes what needs to be filled in the widget. A textrun is a small chunk of text, such as a single line or a word. These low-level form elements act as building blocks in larger constructs that are referred to as high-level form elements, such as textblocks, text fields, choice fields, or choice groups. A textblock is a logical block of self-contained text including one or more textruns. A text field is a collection of a caption and one or more widgets, where a caption is a textblock describing what to fill in the one or more widgets. A choice field is a Boolean field that includes a caption as well as a radio button or similar widget enabling a Boolean choice; the choice field may additionally include one or more other widgets enabling a user to enter text. A choice group is a collection of one or more choice fields and an optional choice group title, which is a textblock that specifies various details or instructions regarding filling the one or more choice fields.

The following non-limiting example is provided to introduce certain embodiments. In this example, an extraction system accesses a set of low-level form elements, including textruns and widgets, extracted from a static form. For instance, these low-level form elements were output from an OCR system or other digitization system. As described below, the extraction system processes the low-level form elements to determine input data for a first analytics engine, which generates predictions for grouping the textruns into high-level form elements, specifically into textblocks. The extraction system then processes the textblocks along with the widgets to determine additional input data, which is processed by a second analytics engine, which generates predictions to group textblocks and widgets into high-level form elements. In this example, the high-level form elements are textblocks, text fields, choice groups, and choice fields.

In some embodiments, the extraction system generates input data that represents the low-level form elements and will be input into the first analytics engine. In this example, the input data includes a corresponding input data subset for each textrun of the static form. Each textrun acts as a reference textrun for determining its corresponding input data subset. For each reference textrun, the extraction system determines a nearby element set of that includes candidate form elements, specifically candidate textruns and candidate widgets selected from the textruns and widgets in the static form and deemed closest to the reference textrun. Further, for each reference textrun, the extraction system generates a sequence of image patches including an image patch corresponding to each candidate form element. Each image patch in the sequence is an image of the region of the static form that includes all the candidate form elements and further includes an outline of the bounding box of the candidate form element on which that image patch is based. Further, for each reference textrun, the extraction system determines a sequence of text contents that include the text components of the various candidate form elements. Thus, the form reconstruction system generates input data that includes various input data subsets, each input data subset corresponding to a reference textrun and including a set of image patches and a set of text contents.

In some embodiments, the extraction system provides this input data to the first analytics engine, or first model. In this example, the first analytics engine includes a set of prediction models acting as sub-models. For instance, the first analytics engine includes an image encoder, a long short-term memory network (LSTM)-based text encoder, a bidirectional long short-term memory network (Bi-LSTM) context encoder, a fusion model, and an LSTM-based sequential association model. In the ongoing example, this set of prediction models have been previously trained end to end to determine textblocks from textruns and widgets. As such, the first analytics engine takes as input the input data and outputs, for each reference textrun, a respective association prediction for each candidate form element for the reference textrun.

In some embodiments, the extraction system utilizes a graph to determine groups of textruns that form textblocks. In this example, for instance, the extraction system generates a graph with each textrun represented by a node. In the graph, an edge connects a pair of textruns, including a first textrun and a second textrun, if an association was predicted for the second textrun with the first textrun as the reference textrun and an association was predicted for the first textrun with the second textrun as the reference textrun. The extraction system identifies disconnected subgraphs within the graph, and each disconnected subgraph corresponds to a predicted textblock that includes the textruns represented as nodes within that disconnected subgraph.

In some embodiments, the extraction system generates additional input data that represents certain form elements, specifically textblocks and widgets in this example, and will be input into the second analytics engine. In this example, the additional input data includes a corresponding input data subset for each textblock that was predicted. Each textblock acts as a reference textblock for determining its corresponding input data subset. For each reference textblock, the extraction system determines a nearby element set of that includes candidate form elements, specifically candidate textblocks and candidate widgets selected from the textblocks and widgets in the static form and deemed closest to the reference textblock. Further, for each reference textblock, the extraction system generates a sequence of image patches including an image patch corresponding to each candidate form element. Each image patch in the sequence is an image of the region of the static form that includes all the candidate form elements and further includes an outline of the bounding box of the candidate form element on which that image patch is based. Further, for each reference textblock, the extraction system determines a sequence of text contents that include the text components of the various candidate form elements. Thus, the form reconstruction system generates additional input data that includes various input data subsets, each input data subset corresponding to a reference textblock and including a set of image patches and a set of text contents.

In some embodiments, the extraction system provides this additional input data to the second analytics engine, or second model. In this example, the second analytics engine includes a set of prediction models acting as sub-models. For instance, the second analytics engine includes an image encoder, an LSTM-based text encoder, a Bi-LSTM context encoder, a fusion model, and an LSTM-based sequential association model. In the ongoing example, this set of prediction models have been previously trained separately from the prediction models of the first analytics engine, and further, this set of prediction models have been trained end to end to determine high-level form elements (i.e., form groups), such as text fields, choice groups, and choice fields, from textblocks and widgets. As such, the second analytics engine takes as input the additional input data and outputs, for each reference textblock, a respective association prediction for each candidate form element for the reference textblock.

In some embodiments, the extraction system utilizes a graph to determine groups of textblocks and widgets that form other high-level form elements, such as text fields, choice groups, and choice fields. In this example, for instance, the extraction system generates a graph with each textblock represented by a respective node and with each widget represented by a respective node. In the graph, an edge connects a pair of form elements including a textblock and a widget if the widget an association was predicted for the widget with the textblock being the reference form element. Further, an edge connects a pair of textblocks, including a first textblock and a second textblock, if an association was predicted for the second textblock with the first textblock as the reference textblock and an association was also predicted for the first textblock with the second textblock as the reference textblock. The extraction system identifies disconnected subgraphs within the graph, and each disconnected subgraph corresponds to a predicted high-level form group that includes the textblocks and widgets represented as nodes within that disconnected subgraph.

Thus, in this example, the extraction system determines each high-level form element (i.e., each predicted group of form elements) based on predictions of the second analytics engine. For instance, a high-level form element identified as described above includes a set of textblocks or widgets, or both, represented in a disconnected subgraph. Further, the extraction system generates a reflowable form based on the static form by, for each high-level form element, linking the form elements grouped in the high-level form element. As a result, when a computing device accesses and displays the reflowable form, the computing device maintains the spatial relationship between form elements within each high-level form element.

Some embodiments described herein provide a technical improvement in the technological field of document structure extraction. Some embodiments implement a hierarchical, multi-modal, bottom-up approach to detect constructs in a form page. Additionally, some embodiments leverage the fact that form elements making up a high-level form element are in close proximity to one another. As a result, an embodiment of the extraction system described herein converts a static form to a reflowable form without human intervention and with a refined result in which form elements are appropriately disambiguated, thereby outperforming existing semantic segmentation techniques.

As used herein, the term "static form" refers to a form that is static, or non-dynamic, such that the static form does not change to enable reflowing. For instance, a static form could be a digital form resulting from scanning a paper form. As such, an example of the static form may include identifiable text or widgets. However, a static form typically lacks, in its metadata or otherwise, an indication of relationships between text and widgets so as to enable a computing device to determine which form elements should stay together if reflowed.

As used herein, the term "reflowable form" refers to a form that includes, such as in metadata, an indication of relationships between certain form elements that should be grouped together. As a result of such an indication, the reflowable form can be reflowed in a manner that retains groups of form elements. Some embodiments described herein convert static forms to reflowable forms or facilitate such conversion by extracting form elements for grouping.

As used herein, the term "textrun" refers to a short chunk of text in a form. For example, a textrun is a string of text in a single word or a single line in the form. Some embodiments described herein predict associations between textruns to group textruns into textblocks.

As used herein, the term "widget" refers to a form object into which information can be entered. An example of a widget can include text describing what a user should enter into the form object. Examples of widgets include a radio button, a checkbox, a text box, or a drop-down box, potentially along with accompanying text describing what to enter into the widget. Some embodiments described herein use widgets as input when determine textblocks and, further, predict associations between widgets and other widgets or textblocks to determine high-level form elements, such as text fields, choice fields, or choice groups.

As used herein, the term "textblock" refers to a logical block of self-contained text that includes one or more textruns. For instance, a textblock could include multiple lines of text grouped together. Some embodiments described herein predict textblocks based on textruns and widgets. Further, some embodiments predict associations between textblocks and other textblocks or widgets to determine high-level form elements, such as text fields, choice fields, or choice groups.

As used herein, the term "low-level form element" refers to a form element, also referred to a form structure, that can be extracted from a static form. According to some embodiments, low-level form elements include textruns and widgets.

As used herein, the term "second-level form element" refers to a form element that is a group of form elements that embodiments of the extraction system described herein can predict based on low-level form elements. According to some embodiments, second-level form elements include textblocks. Further, in some embodiments, textblocks are also classified as high-level form elements.

As used herein, the term "high-level form element" refers to a form element that is a group of form elements that embodiments of the extraction system described herein can predict based on a combination of low-level form elements and second-level form elements. According to some embodiments, high-level form elements include textblocks, text fields, choice fields, and choice groups.

As used herein, the term "text field" refers to collection of one or more widgets and one or more captions. For instance, a caption is a textblock that describes how to fill a widget. Some embodiments described herein predict text fields based on textblocks and widgets.

As used herein, the term "choice field" refers to a Boolean field including a caption, a selectable widget (e.g., a radio button or a check box), and optionally one or more other widgets enabling text entry. Some embodiments described herein predict choice fields based on textblocks and widgets.

As used herein, the term "choice group" refers to a collection of one of more choice fields along with an optional textblock, where the textblock acts as a choice group title that specifies instructions or other details related to the choice fields. Some embodiments described herein predict choice groups based on textblocks and widgets.

As used herein, the term "prediction model" refers to a machine-learning model that is trained to make predictions. In some embodiments, an analytics engine described herein includes a network of prediction models that together predict second-level form elements based on low-level form elements or predict high-level form elements based on low-level form elements and second-level form elements.

As used herein, the term "analytics engine" refers to a network of prediction models that have been trained to make a prediction about associations between form elements. In some embodiments, a first analytic engine described herein predicts textblocks based on textruns and widgets, and a second analytics engine described herein predicts high-level form elements, such as textblocks, text fields, choice fields, and choice groups, based on textblocks and widgets.

As used herein, the term "training system" refers to a system that trains a network of prediction models to make predictions about associations between form elements. In some embodiments, the training system trains the first analytics engine to predict second-level form elements or trains the second analytics engine to predict high-level form elements, or both. An embodiment of the training system is implemented as hardware, software, or a combination of hardware and software.

As used herein, the term "input-generation subsystem" refers to a system that generates input data appropriate for use by the first analytics engine or the second analytics engine, or both. In some embodiments, the input-generation subsystem generates input data based on textruns and widgets for input to the first analytics engine or generates additional input data based on textblocks and widgets for input to the second analytics engine, or both. An embodiment of the input-generation subsystem is implemented as hardware, software, or a combination of hardware and software.

As used herein, the term "form-generation subsystem" refers to a system that links form elements into high-level form elements to generate a reflowable form. In some embodiments, the form-generation subsystem generates a reflowable form based on predicted high-level form elements that include low-level form elements extracted from a static form. An embodiment of the form-generation subsystem is implemented as hardware, software, or a combination of hardware and software.

Referring now to the drawings, FIG. 1 is a diagram of an example of an extraction system 100 configured to extract form structures (e.g., high-level form elements) and thereby facilitate construction of a reflowable form 110, according to some embodiments described herein. Some embodiments convert static forms 120 to reflowable forms 110 in this manner. As shown in FIG. 1, in some embodiments, the extraction system 100 includes one or more of the following: an input-generation subsystem 130; two analytics engines, including a first analytics engine 140 and a second analytics engine 145; and a form-generation subsystem 150. In some embodiments, the extraction system 100 or some preprocessing component takes as input a static form 120, such as a digital document that is the result of scanning a paper-based form, and extracts low-level form elements. The input-generation subsystem 130 generates input data based on and describing the low-level form elements. The first analytics engine 140 takes the input data and, using one or more prediction models based on machine learning, determines high-level form elements, specifically second-level form elements. The input-generation subsystem 130 receives as input the second-level form elements and the low-level form elements and generates additional input data, which is provided as input to the second analytics engine 145. The second analytics engine 145 takes the additional input data and, using one or more prediction models based on machine learning, determines additional high-level form elements. The form-generation subsystem 150 generates a reflowable form by linking low-level form elements within each respective high-level form element, such that each high-level form element remains together during reflowing.

Additionally, in some embodiments, a training system 160 trains the prediction models of the first analytics engine 140 and the second analytics engine 145 to enable such prediction models to determine (i.e., predict) associations between form elements as described herein. The training system 160 may be integrated with the extraction system 100 or may be separate from the extraction system 100 but enabled to facilitate operation of the extraction system 100 by training the prediction models prior to operation of the first analytics engine 140 and the second analytics engine 145. For instance, in one example embodiment, the training system 160 is distinct from the extraction system 100 in that the training system 160 runs on a first set of computing systems and transmits the trained prediction models of the first analytics engine 140 and the second analytics engine to a second set of computing systems on which the extraction system 100 runs or to which the extraction system 100 has access.

Each of the input-generation subsystem 130, the first analytics engine 140, the second analytics engine 145, the form-generation subsystem 150, and the training system 160 can be implemented in hardware, software, or a combination of both. For instance, each such component can be one or more software methods, one or more specialized hardware devices, or some combination of these or other hardware or software. Further, although the input-generation subsystem 130, the first analytics engine 140, the second analytics engine 145, the form-generation subsystem 150, and the training system 160 are described herein as being distinct, it will be understood that this distinction is made for illustrative purposes only. For instance, one or more of these components could be combined into common software, common hardware, or a combination of both.

In some embodiments, the static form 120 is not a reflowable form. For instance, the static form 120 could be a digital form resulting from scanning a paper form and possibly applying optical character recognition (OCR). As such, an example of the static form 120 includes identifiable text (e.g., textruns) and widgets (e.g., radio buttons), as will be described further below; however, the static form 120 does not provide an indication of relationships between the text and the widgets, and as such, the static form 120 cannot be reflowed because there is no indication of which text and widgets should remain grouped together and which can be separated to enable reflowing. As such, the static form 120 is fixed in a single layout per form page.

Some embodiments described herein analyze form elements of the static form 120 to determine how the form elements are grouped together into high-level form elements, each of which is a group of form elements (e.g., low-level form elements). For instance, the extraction system 100 groups low-level form element, such as textruns and widgets, into form groups, or high-level form elements, such as textblocks, text fields, choice fields, and choice groups. As such, the reflowable form 110 that results is reflowable because of a linking among textruns and widgets within high-level form elements. Such linking indicates which form elements must remain together and which can be separated during reflowing. As a result, some embodiments convert static forms 120 into reflowable forms 110 while maintaining the same form elements and a similar form experience.

More specifically, as described in detail below, some embodiments use a multi-modal patch association approach to extract form structures and, specifically, to extract higher order constructs (i.e., high-level form elements) from lower level constructs (i.e., low-level form elements) of a static form 120. In some embodiments, the extraction system 100 obtains a local image patch around each low-level form element that acts as a reference, by identifying candidate form elements closest to the reference. The extraction system 100 processes textual and spatial representation of candidate form elements sequentially through a Bi-LSTM model to obtain context-aware representations, which the extraction system 100 fuses with image patch features. A fused feature vector is passed to a sequential decoder, which predicts associations between each reference and its candidate form elements. The extraction system 100 uses the predicted associations to determine the high-level form elements through connected-components analysis. With these high-level form elements identified, some embodiments link the low-level form elements into the high-level form elements, thus enabling the high-level form elements to remain together during reflowing of the form.

Figure 2:
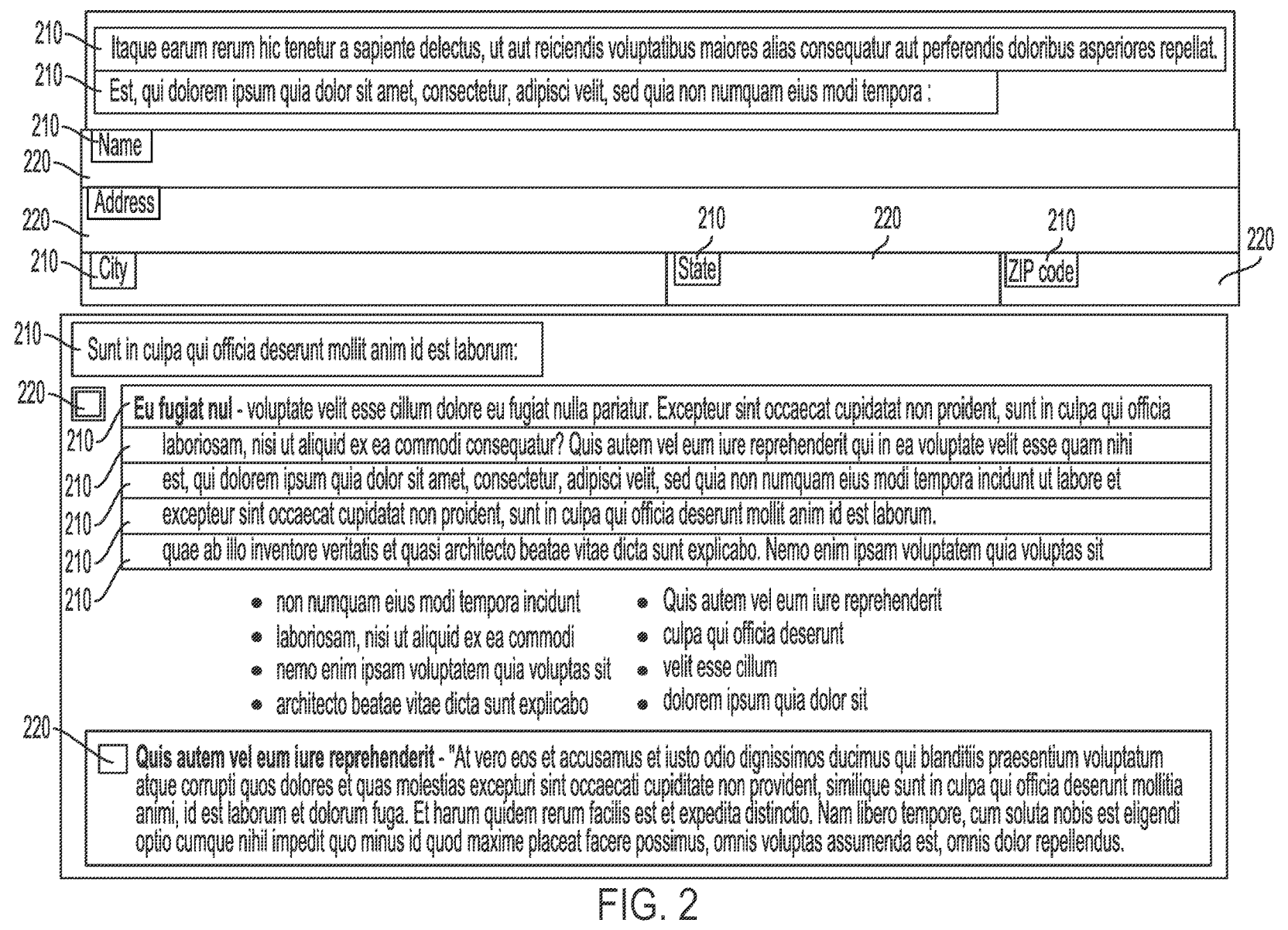

FIG. 2 shows an example of low-level form elements in a static form 120, according to some embodiments described herein. In some embodiments, a static form 120 has a fixed layout and does not include, in associated metadata or otherwise, an indication of which form elements need to be grouped together. As such, reflowing the form is not possible because it is not clear where to break form elements such that related form elements remain together. An example of the static form 120 includes various form elements such as low-level form elements and high-level form elements, where the high-level form elements can include second-level form elements.

FIG. 2 illustrates certain low-level form elements in one example. Specifically, as shown, an example of the static form 120 includes low-level form elements such as textruns 210 and widgets 220. For instance, a textrun 210 is a short chunk of text, such as a single word or a string of text in a single line of the form 200, and a widget 220 is a form object into which information can be entered, where a widget 220 may also include text describing what a user should enter into the form object. Examples of widgets 220 include a radio button, a checkbox, a text box, or a drop-down box, potentially along with accompanying text describing what to enter into the widget 220. For the sake of simplicity and clear illustration, not all low-level form elements are labeled in the example of FIG. 2.

Figure 3:
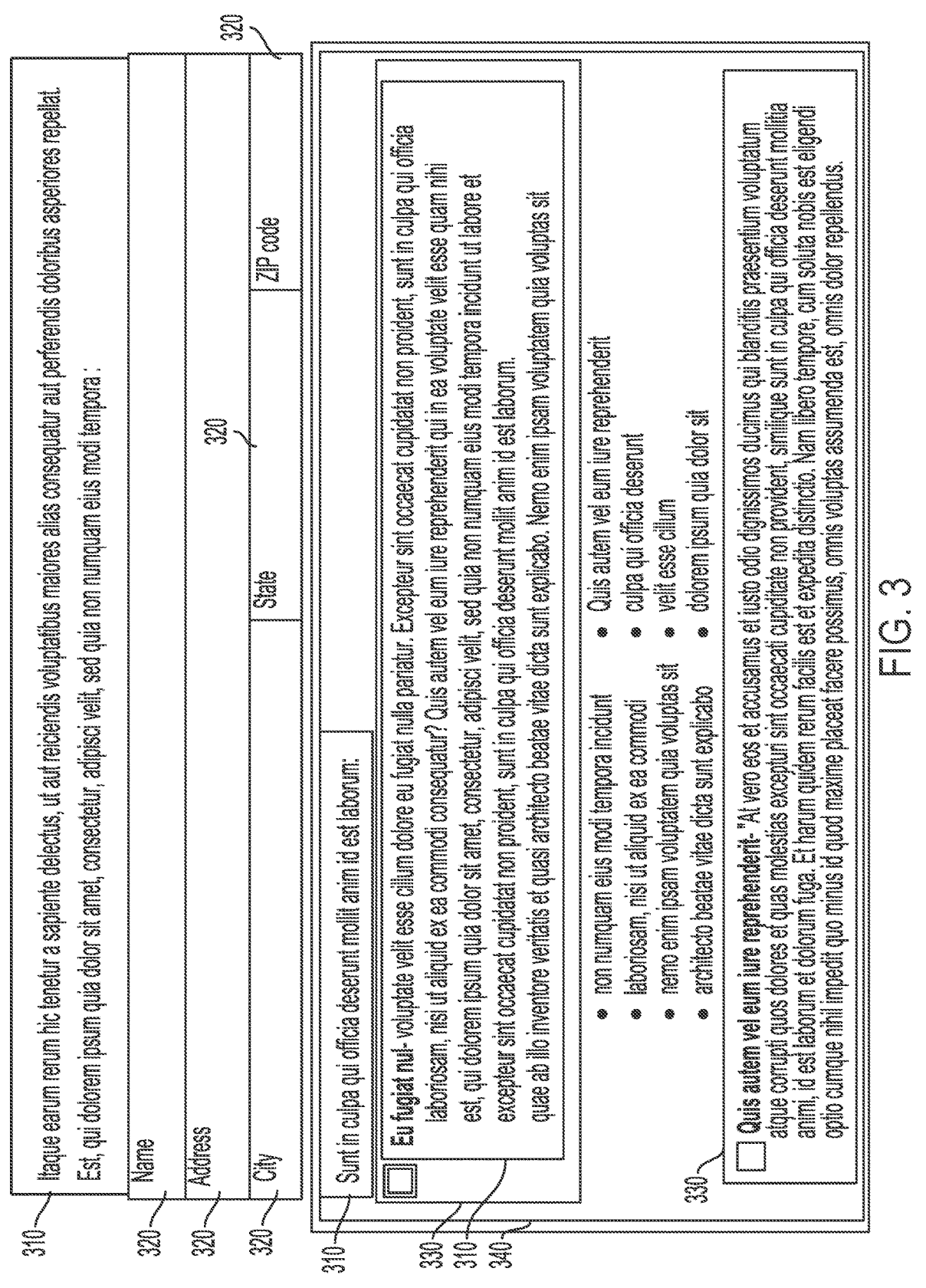

FIG. 3 shows an example of high-level form elements in the static form 120 illustrated in FIG. 2, according to some embodiments described herein. In some embodiments, a high-level form element is a group of one or more related, or associated, low-level form elements or second-level form elements; a second-level form elements is a subclass of high-level form elements and is a group of one or more low-level form elements. Specifically, the high-level form elements shown in FIG. 3 include textblocks 310, text fields 320, choice fields 330, and choice groups 340. For instance, a textblock 310 is a logical block of self-contained text that includes one or more textruns 210; a text field 320 is a collection of one or more widgets 220 and one or more captions, where a caption is a textblock 310 that describes how to fill a widget (e.g., a caption asks a user to select one radio button within a set of widgets that are radio buttons); a choice field 330 is a Boolean field including a caption, a selectable widget (e.g., a radio button or a check box), and optionally one or more other widgets enabling text entry;

and a choice group 340 is a collection of one of more choice fields 330 along with an optional textblock 310, where the textblock 310 acts as a choice group title that specifies instructions or other details related to the choice fields 330. For the sake of simplicity and clear illustration, not all high-level form elements are labeled in the example of FIG. 3.

Figure 4:
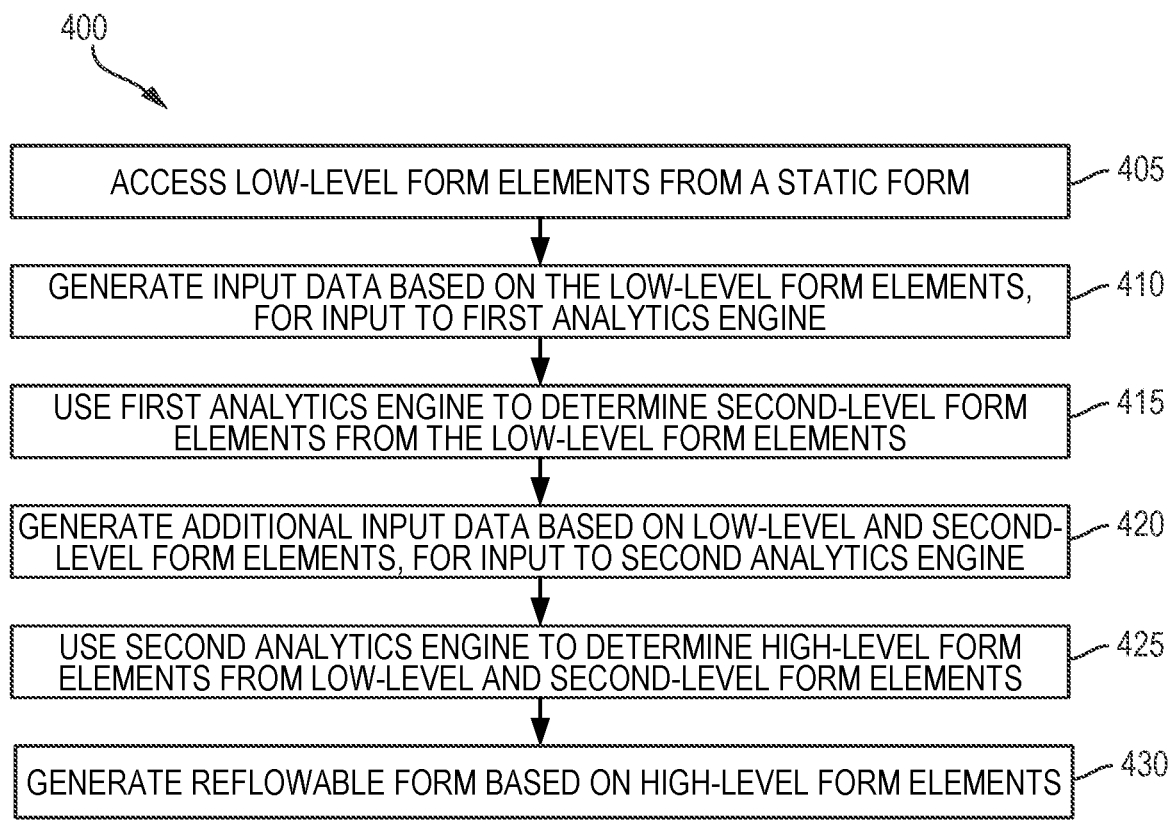
FIG. 4 is a diagram of an example of a process of generating a reflowable form based on a static form, according to some embodiments described herein.

FIG. 4 is a diagram of an example of a process 400 of generating a reflowable form 110 based on a static form 120, according to some embodiments described herein. In some embodiments, the process 400 or similar enables a static form 120 to be automatically converted into a reflowable form 110. As a result, the reflowable form 110 can be used in place of the static form 120, to provide a similar experience as the static form 120, on various devices with various display sizes or font sizes. The process 400 depicted in FIG. 4 and described below is intended to be illustrative and non-limiting. Although FIG. 4 depicts various activities occurring in a particular sequence or order, this is not intended to be limiting. In certain embodiments, for instance, the activities may be performed in a different order, or one or more activities of the process 400 may be performed in parallel. In certain embodiments, the process 400 may be performed by the extraction system 100.

As shown in FIG. 4, at block 405, the process 400 involves accessing low-level form elements from a static form 120. For instance, in some embodiments, the extraction system 100 or some other system has extracted the low-level form elements, which may include textruns 210 and widgets 220, from the static form 120, such as by performing OCR on the static form 120. An example OCR technique extracts widgets 220 and chunks of text, which act as textruns 210, and thus an embodiment of the extraction system 100 could access output from such an OCR technique to access the textruns 210 and widgets 220 of the static form 120. Various other techniques exist for extracting low-level form elements, such as textruns 210 and widgets 220, from the static form 120, and one or more of such techniques may be used in some embodiments.

At block 410, the process 400 involves generating input data to be provided to the first analytics engine 140, based on the low-level form elements accessed at block 405. In some embodiments, as described in more detail below, the extraction system 100 generates an input data subset (i.e., a subset of the input data) corresponding to each textrun 210. For a reference textrun 210, the input data subset includes a set of image patches and a set of text contents representing other low-level form elements located proximate the reference textrun 210. Activities involved in generating this input data are described below in detail.

At block 415, the process 400 involves determining second-level form elements from the low-level form elements accessed at block 405, through the use of the first analytics engine 140. As will be described below in detail, some embodiments of the first analytics engine 140 take as input the input data describing the low-level form elements and output second-level form elements. Specifically, for instance, the first analytics engine 140 takes as input the input data generated at block 410 to describe the textruns 210 and widgets 220, and the first analytics engine 140 predicts textblocks 310, each of which is a combination of one or more textruns 210, based on the textruns 210 and widgets 220 as described in the input data.

At block 420, the process 400 involves generating additional input data to be provided to the second analytics engine 145, based on the low-level form elements accessed at block 405 and the second-level form elements determined at block 415. In some embodiments, as described in more detail below, the extraction system 100 generates an input data subset, which is a subset of the additional input data, corresponding to each textblock 310. For a reference textblock 310, the input data subset includes a set of image patches and a set of text contents representing other form elements, such as low-level form elements and second-level form elements, located proximate the reference textblock 310. Activities involved in generating this additional input data are described below in detail.

At block 425, the process 400 involves determining high-level form elements from the low-level form elements accessed at block 405 and the second-level form elements determined at block 415, through the use of the second analytics engine 145. As will be described below in detail, some embodiments of the second analytics engine 145 take as input the additional input data describing the low-level form elements and second-level form elements and output high-level form elements. Specifically, for instance, the second analytics engine 145 takes as input the additional input data generated at block 420 to describe the textblocks 310 and widgets 220, and the second analytics engine 145 predicts textblocks 310, text fields 320, choice fields 330, and choice groups 340, based on the textblocks 310 and widgets 220 as described in the additional input data. Each of the textblocks 310, text fields 320, choice fields 330, and choice groups 340 is a combination of one or more textruns 210 or widgets 220.

At block 430, the process 400 involves generating a reflowable form 110 based on the high-level form elements determined in block 425. In some embodiments, to generate a reflowable form 110, the form-generation subsystem 150 of the extraction system 100 associates together the various low-level form elements making up a respective high-level form element. For instance, each such association could be indicated in metadata for the reflowable form 110. Such an association indicates that the low-level form elements should be kept together, for instance, in terms of their arrangement relative to one another. Thus, the reflowable form 110 is a reflowable because a device configured to read and display the reflowable form 110 identifies an indication of each such association and therefore maintains the spatial relationship among low-level form elements within each high-level form element.

Figure 5:
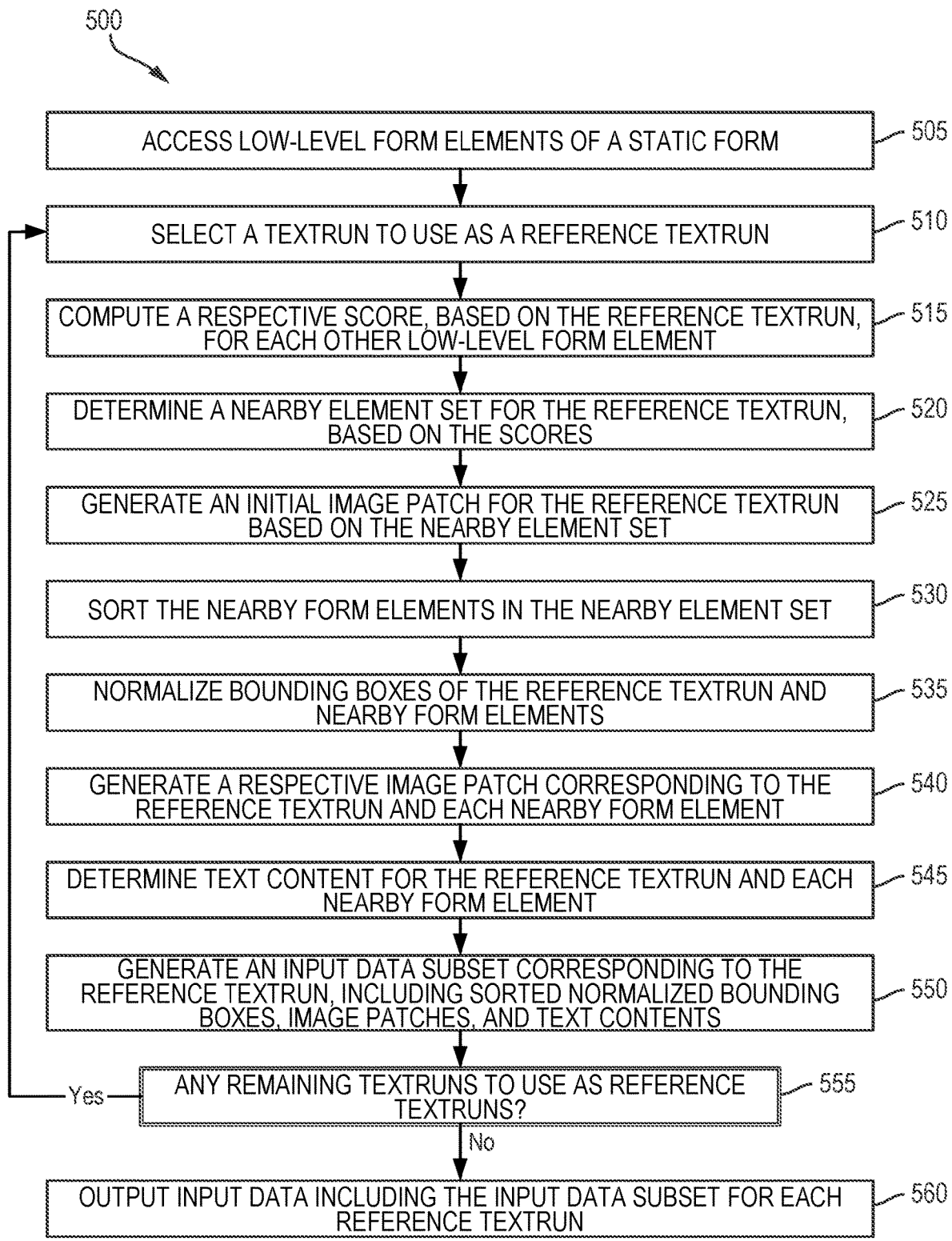
FIG. 5 is a diagram of an example of a process for generating input data for use by a first analytics engine of the extraction system, according to some embodiments described herein.

FIG. 5 is a diagram of an example of a process 500 for generating input data for use by the first analytics engine 140, according to some embodiments described herein. For instance, in some embodiments, the input-generation subsystem 130 of the extraction system 100 executes this process 500 or similar at block 410 of the above process 400, in preparation for sending data to the first analytics engine. As mentioned above, some embodiments of the first analytics engine 140 determine textblocks 310 from textruns 210 and widgets 220. The first analytics engine 140 includes a series of prediction models that take various inputs, with each prediction model in the series taking input that relies on the input data generated in this process 500 or on output of one or more prior prediction models in the series. Although FIG. 5 depicts various activities occurring in a particular sequence or order, this is not intended to be limiting. In certain embodiments, for instance, the activities may be performed in a different order, or one or more activities of the process 500 may be performed in parallel. In certain embodiments, the process 500 may be performed by the extraction system 100.

At block 505, the process 500 involves accessing the low-level form elements, specifically the textruns 210 and widgets 220, of the static form 120 for which form structures are to be extracted. For instance, as described above, the textruns 210 and widgets 220 may have been extracted from the static form 120 using an OCR technique.

Block 510 of the process 500 begins an iterative loop in which each iteration of the loop corresponds to a textrun 210 accessed at block 505 (i.e., a textrun 210 of the static form 120). During the loop, an input data subset is generated to be included in the input data that will be provided to the first analytics engine 140. Thus, at block 510, the process 500 involves selecting a textrun 210 that has not yet been considered and setting that textrun 210 as a current reference textrun 210.

At block 515, the process 500 involves computing a proximity score, based on the reference textrun 210, to each low-level form element accessed at block 505 other than the reference textrun 210 itself. For instance, the proximity score may be based on a scoring function that takes as input a low-level form element and outputs a score, or distance, indicating proximity to the reference textrun 210.

For instance, suppose T is the set of textruns 210 in the form, W is the set of widgets 220, and the set of all low-level form elements in the form is E=T∪W. Given a reference textrun t ∈T and t ∈E, and given another low-level form element e ∈E, which can be either a textrun 210 or a widget 220, an example of the scoring function assigns the following score to e with respect to the reference textrun t:

$$s(t, e) = \alpha \times \min\left(\left|y_t - \left(y_e - \frac{h_e}{2}\right)\right|, |y_t - y_e|, \left|y_t - \left(y_e + \frac{h_e}{2}\right)\right|\right) + \beta \times \min\left(\left|x_t - \left(x_e - \frac{w_e}{2}\right)\right|, |x_t - x_e|, \left|x_t - \left(x_e + \frac{w_e}{2}\right)\right|\right)$$

In the above, $x_t$ and $y_t$ are respectively the x- and y-coordinates of the midpoint of a bounding box (e.g., the minimum bounding box) of the reference textrun t; $w_t$ and $h_t$ are respectively the width and height of that bounding box of the reference textrun t; $x_e$ and $y_e$ are respectively the x- and y-coordinates of the midpoint of a bounding box (e.g., the minimum bounding box) of the low-level form element e; and $w_e$ and $h_e$ are respectively the width and height of that bounding box of the low-level form element e. In some embodiments, as in this example scoring function, for both the x- and y-dimensions, proximity can be determined based on the distance between midpoints of the reference textrun 210 versus the other form elements or based on the distance of the midpoint of the reference textrun 210 to either extreme end (e.g., leftmost or rightmost in the x-dimension or top or bottom in the y-dimension), depending on which yields a minimal distance.

Additionally, in the above example scoring function, the scalars α and β are weighting factors indicating the importance of vertical closeness, corresponding to the scalar α, versus horizontal closeness, corresponding to the scalar β. In one example, α=10 and β=1, giving ten times greater weight to vertical proximity, because testing has shown that vertical proximity is a better indicator of a relationship between form elements as compared to horizontal proximity.

At block 520, the process 500 involves determining a nearby element set, $e^p$, for the reference textrun 210, where the nearby element set is a set of low-level form elements deemed to be close (e.g., closest based on the scoring function) to the reference textrun 210. In some embodiments, the extraction system 100 selects the $k_1$ highest ranked, or lowest scoring, textruns 210 and the $k_2$ highest ranked, or lowest scoring, widgets 220. For instance, in some embodiments, $k_1$=6 and $k_2$=4. In other words, an embodiment of the form-reconstruction system 100 ranks the low-level form elements based on their scores, as assigned in block 515. If the scoring function assigns relatively low scores to close form elements, as in the above example scoring function, then the form elements could be ranked from lowest scoring to highest scores; however, if a different scoring function than above is used and that scoring function assigns relatively high scores to close form elements, the form elements could be ranked from highest scoring to lowest scoring. In either case, the nearby element set may include form elements deemed to be closest to the reference textrun 210 and further may include a predetermined number of textruns 210 deemed to be the closest textruns 210 and a predetermined number of widgets 220 deemed to be the closest widgets 220.

At block 525, the process 500 involves generating an initial image patch, p, representing a portion of the static form 120 enclosed by a united bounding box corresponding to the reference textrun 210. In some embodiments, the extraction system 100 determines the united bounding box as the union of the bounding boxes of the low-level form elements in the nearby element set $\alpha^p$. This united bounding box defines the boundaries of the initial image patch, which includes the reference textrun 210 as well as the low-level form elements in the nearby element set. Further, in some embodiments, the extraction system 100 highlights the reference textrun 210 in the initial image patch, such as by drawing a rectangular outline around the reference textrun 210. For instance, the rectangular outline may be provided in a color (e.g., blue) to provide distinction from the rest of the initial image patch.

At block 530, the process 500 involves sorting the nearby form elements (i.e., the form elements in the nearby element set) based on natural reading order. For instance, in some embodiments, the extraction system 100 sorts (i.e., orders) the nearby form elements based on natural reading order. For instance, in a left-to-right language, such as English, a natural reading order is from top to bottom in horizontal scan lines from left to right. In one example, each nearby form element is deemed located at the point at the upper left of its bounding box, and thus, an example of the extraction system 100 scans left to right in rows from top to bottom, while adding a form element to the order when the upper-left corner of that form element is encountered. This results in an ordered set, or sequence, of low-level form elements in the nearby element set as follows, when the nearby element set includes the $k_1$ textruns 210 and the $k_2$ widgets 220 that are included in the initial image patch p corresponding to the reference textrun 210: $\alpha^p = \{\alpha_0^p, \alpha_1^p, \alpha_2^p, \ldots, \alpha_{k_1+k_2}^p\}$. In the set $\alpha^p$, the zeroth element $\alpha_0^p$ is the reference textrun 210 itself.

Each nearby form element has a bounding box, as mentioned above, such as a minimum bounding box. An embodiment of the extraction system 100 determines an ordered set of bounding boxes, where each bounding box corresponds to a respective nearby form element and where the set is sorted according to the order determined for the nearby form elements. In other words, an example of the ordered set (i.e., the sequence) of bounding boxes is $bb^a = \{bb_0^a, bb_1^a, bb_2^a, \ldots, bb_{k_1+k_2}^a\}$, where $bb_0^a$ is the bounding box of the reference textrun 210, and each other $bb_i^a$ is the bounding box of the nearby form element $\alpha_i^p$ in the initial image patch p that corresponds to the reference textrun 210. Each bounding box $bb_i^a$ in the sequence can be represented as $bb_i^a = \{x_i^a, y_i^a, w_i^a, h_i^a\}$, where $x_i^a$ and $y_i^a$ are the respective x- and y-coordnates of the top-left corner of the bounding box, and where $w_i^a$ and $h_i^a$ are the respective width and height of the bounding box.

At block 535, the process 500 involves normalizing the bounding boxes in the sequence. In some embodiments, the extraction system 100 normalizes the bounding boxes in the range of [0, 1], inclusive, based on the size of the united bounding box corresponding to the reference textrun 210. For instance, the coordinates $(x_i^a, y_i^a)$ of a bounding box of an element $a_i^p$ are normalized to a range of [0, 1] based on the width and height of the initial image patch p corresponding to the reference textrun 210, and the width and height $(w_i^a, h_i^a)$ are normalized to a range of [0, 1] to represent the fractions of the wdth and height of the initial image patch p. The result is an ordered set of normalized bounding boxes $bb^n = \{bb_0^n, bb_1^n, bb_2^n, \ldots, bb_{k_1+k_2}^n\}$, where $bb_0^n$ is the normalized bounding box of the reference textrun 210.

At block 540, the process 500 involves generating an image patch, based on the initial image patch p, for each nearby form element and the reference textrun 210. As described above, the initial image patch corresponding to the reference textrun 210 is a rectangular portion of the static form 120 that corresponds to a united bounding box including the various bounding boxes of the nearby form elements. In some embodiments, the extraction system 100 generates a respective image patch for each nearby form element, where the respective image patches are based on the initial image patch for the reference textrun 210. For the reference textrun $\alpha_0^p$, the respective image patch may be set equal to the initial image patch. For a given nearby form element $a_i^p$ for i>0, the respective image patch is the initial image patch with the bounding box $bb_i^a$ of the element highlighted, for instance, such that a rectangular outline representing the bounding box appears in the image patch. For instance, the rectangular outline may be in a color (e.g., green) other than the color in which the reference textrun 210 is outlined. An embodiment of the extraction system 100 resizes each such image patch to H×W and concatenates a normalized two-dimensional mesh grid of that same resolution to the image patch to obtain a five-channel image (i.e., three color channels and two channels for the two-dimensional mesh grid). For example, H=160 and W=640.

In some embodiments, the extraction system 100 orders the image patches, modified as described above, based on the order determined above for the nearby form elements. Thus, the ordered set of image patches are $im_p^f = \{im_0^p, im_1^p, im_p^2, \ldots im_{k_1+k_2}^p\}$, where $im_0^p$ is the initial image patch modified as described above and where each other such image patch $im_i^p$ corresponds to a nearby form element of the reference textrun 210 and has that nearby form element highlighted.

At block 545, the process 500 involves determining text content of the nearby form elements for the reference textrun 210. For instance, each textrun 210 and each widget 220 in the nearby element set may include text content, such that text content $t_i^a$ is the text content of an element $a_i^p$. In some embodiments, similar to the normalized bounding boxes and the image patches, the text contents form an ordered set, $\{t_0^a, t_1^a, t_2^a, \ldots, t_{k_1+k_2}^a\}$, corresponding to the order of the nearby form elements with to being the text content of the reference textrun 210.

At block 550, the process 500 involves generating an input data subset to be included in input data that will be provided to the first analytics engine 140. In some embodiments, the input data subset includes the ordered sets of normalized bounding boxes, image patches, and text contents corresponding to the reference textrun 210.

At decision block 555, the process 500 involves determining whether any textruns 210 remain to be considered as the reference textrun 210. If such a textrun 210 remains, then the process 500 returns to block 510 to select another textrun 210 as the reference textrun 210. However, if no such textruns 210 remain to be considered, then at block 560, the process 500 involves outputting the input data that includes each input data subset determined for each textrun 210.

Figure 6:
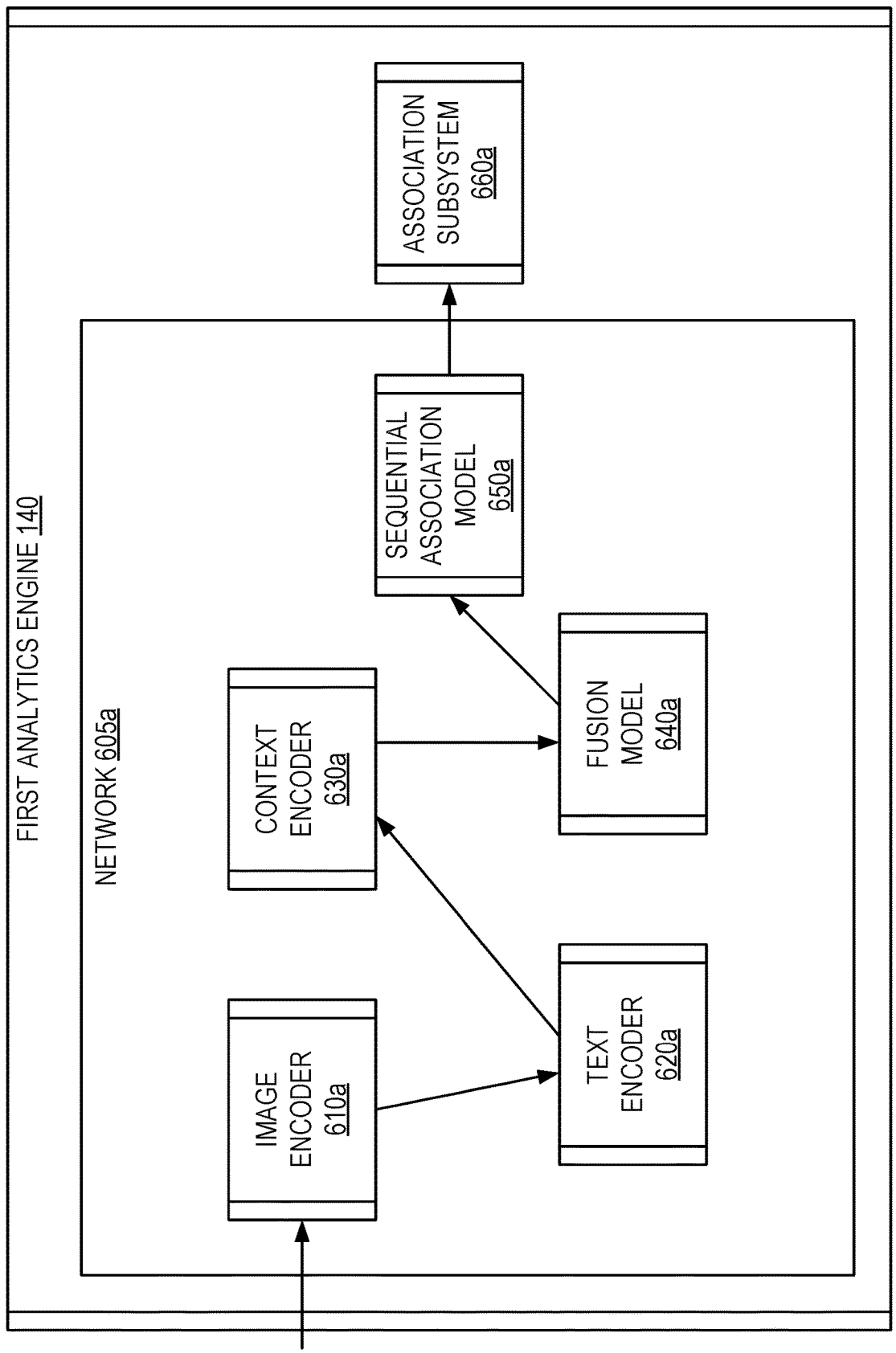
FIG. 6 is a diagram of an example of the first analytics engine, according to some embodiments described herein.

FIG. 6 is a diagram of an example of the first analytics engine 140, according to some embodiments described herein. In some embodiments, the first analytics engine 140 determines textblocks 310 based on textruns 210 and widgets 220; more specifically, an example of the first analytics engine 140 combines textruns 210 into textblocks 310 based on the textruns 210 and the widgets 220, such that the resulting number of textblocks 310 is no greater than the number of textruns 210 in the static form 120.

In some embodiments, the first analytics engine 140 includes a network 605a of one or more prediction models. As shown in FIG. 6, an example of the first analytics engine 140 includes one or more of (e.g., all of) the following prediction models: an image encoder (IE) 610a, a text encoder (TE) 620a such as an LSTM-based text encoder, a context encoder (CE) 630a such as a Bi-LSTM context encoder, a fusion model (FM) 640a, and a sequential association model (SAM) 650a such as an LSTM-based sequential association model. In some embodiments, the first analytics engine 140 takes, as input, data describing the textruns 210 and widgets 220. More specifically, an embodiment of the first analytics engine 140 takes, as input, input data that includes various input data subsets, each input data subset including ordered sets of normalized bounding boxes, image patches, and text contents corresponding to a respective reference textrun 210 for the input data subset.

In some embodiments, the sequence of the IE 610a, the TE 620a, the CE 630a, the FM, and the SAM 650a outputs a set of association predictions, which indicate associations between each reference textrun 210 and its corresponding nearby form elements. The first analytics engine 140 further includes an association subsystem 660a, which predicts high-level form elements based on the association predictions for the various reference textruns 210.

Each of the IE 610a, the TE 620a, the CE 630a, the FM 640a, the SAM 650a, and the association subsystem 660a can be implemented in hardware, software, or a combination of both. For instance, each such component can be one or more software methods, one or more specialized hardware devices, or some combination of these or other hardware or software. Further, although the IE 610a, the TE 620a, the CE 630a, the FM 640a, the SAM 650a, and the association subsystem 660a are described herein as being distinct, it will be understood that this distinction is made for illustrative purposes only. For instance, one or more of these components may be combined into common software, common hardware, or a combination of both.

Figure 7:
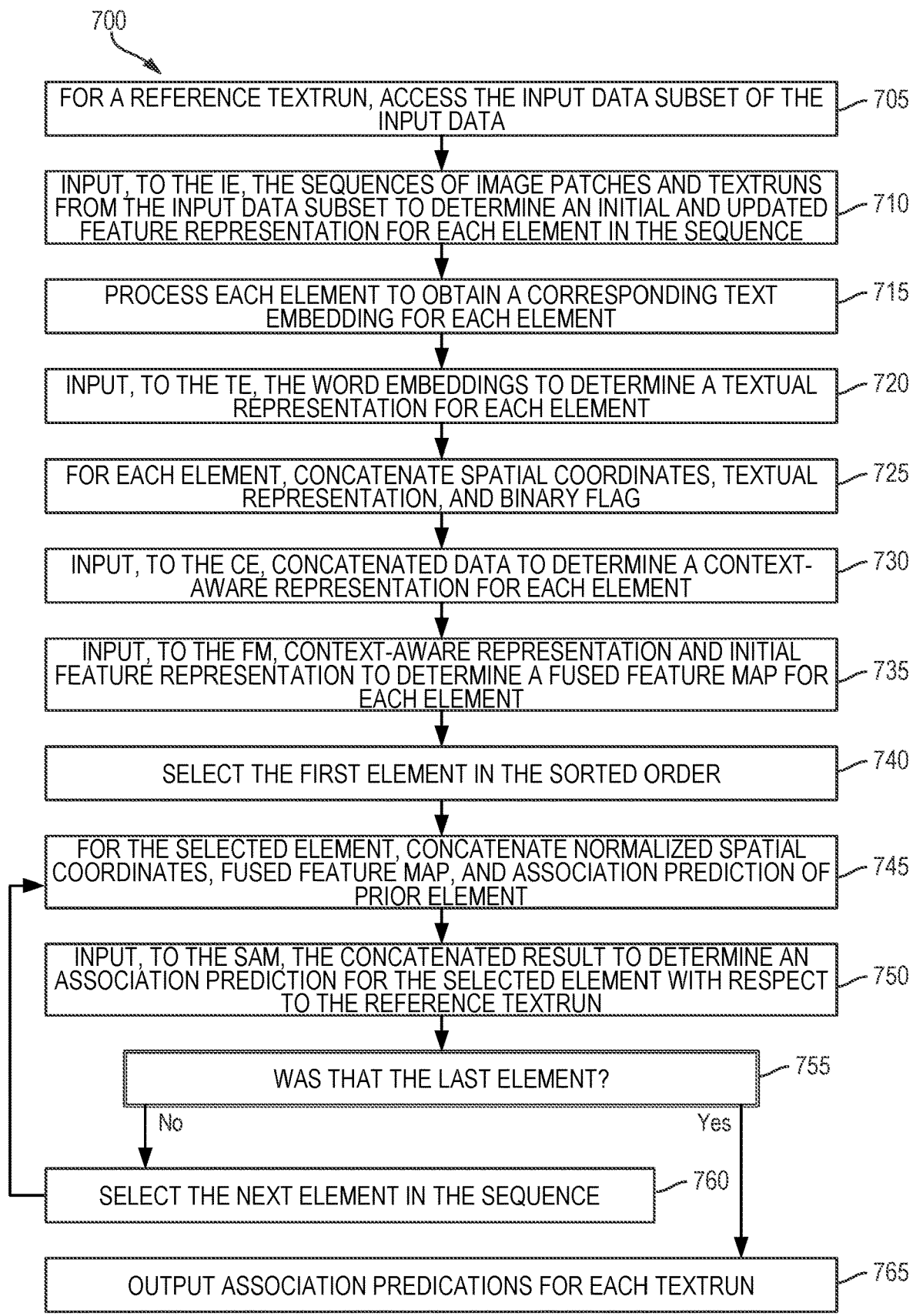
FIG. 7 is a diagram of an example of a process of using the first analytics engine to determine association predictions for a reference textrun, according to some embodiments described herein.

FIG. 7 is a diagram of an example of a process 700 of using the first analytics engine 140 to determine association predictions for a reference textrun 210, according to some embodiments described herein. In some embodiments, the extraction system 100 performs this process 700 or similar for each textrun 210 in the static form 120, so as to determine association predictions between each reference textrun 210 and its nearby form elements, which are now treated as candidate elements that potentially have associations with the reference textrun 210. Although FIG. 7 depicts various activities occurring in a particular sequence or order, this is not intended to be limiting. In certain embodiments, for instance, the activities may be performed in a different order, or one or more activities of the process 700 may be performed in parallel. In certain embodiments, the process 700 may be performed by the extraction system 100.

As shown in FIG. 7, at block 705, the process 700 involves, for the reference textrun 210, accessing the input data subset corresponding to the reference textrun 210. For instance, the input data subset includes, for the reference textrun 210, the corresponding sequence of image patches $im^p = \{im_0^p, im_1^p, im_2^p, \ldots, im_{k_1+k_2}^p\}$, with each $im_i^p$ for $i>0$ corresponding to a respective candidate element (i.e., each respective nearby form element) and having that respective candidate element highlighted in addition to the reference textrun 210 being highlighted, and with $im_0^p$ having only the reference textblock 310 highlighted; the corresponding sequence of text contents $t^a = \{t_0^a, t_1^a, t_2^a, \ldots, t_{k_1+k_2}^a\}$, with each $t_0^a$ being the text content of the reference textrun 210 and with $t_i^a$ for $i>0$ being the text content of a respective candidate element; and the corresponding sequence of normalized bounding boxes $bb^n = \{bb_1^n, bb_2^n, \ldots, bb_{k_1+k_2}^n\}$, with $bb_0^n$ being the normalized bounding box of the reference textrun 210 and with each $bb_i^n$ for $i>0$ being the normalized bounding box of a respective candidate element.

At block 710, the process 700 involves inputting the sequence of image patches and the sequence of text contents into the IE 610a. As described below, in some embodiments, the IE 610a inputs each image patch $im_i^p$ described above and generates a corresponding feature representation using a convolutional neural network (CNN).

In some embodiments, each image patch in the sequence has dimensions H×W×5, as described above. An embodiment of the IE 610a processes the sequence of image patches through the CNN. In some embodiments, the CNN of the IE 610a has $n_{cb}$ convolution blocks; for instance, $n_{cb}=5$. A convolution block $cb_j$ includes $n_{jc}^l$ convolution layers, each having $f_j$ filters with kernel size $k_j \times k_j$ and a stride of 1. For example, $[n_j^{cl}]_{j=1,2,3,4,5} = [2,2,3,3,3]$; $[f_j]_{j=1,2,3,4,5} = [32,64,96,128,256]$; and $[k_j]_{j=1,2,3,4,5} = [5,3,3,3,3]$.

In some embodiments, the IE 610a applies, in the CNN, a maxpooling layer to each image patch after each convolution block to generate an initial feature representation. An example of the maxpooling layer has a kernel size of 3×3 and a stride of 2. An embodiment of the CNN outputs, for each image patch and thus for each element associated with the reference textrun 210 (i.e., the candidate elements for the reference textrun 210 as well as the reference textrun 210 itself), an initial feature representation $f_i^V$ of output size H'×W'× C', where C' is the number of feature maps in the CNN. For instance, in some embodiments, H'=5, W'=20, and C'=256. As discussed below, this initial feature representation $f_i^V$ is used by the FM 640a.

In an auxiliary branch, an embodiment of the IE 610a passes a flattened initial feature representation $f_i^V$ through a fully convolutional network (FCN) in which, for example, all convolution layers have rectified linear unit (ReLU) activation. An example of the FCN includes two fully connected layers, each having $FC_c$ units. For instance, in some embodiments, $FC_c=1024$. The FCN thus updates the feature representation to provide an updated feature representation $f_i^p$ for a given image patch $im_i^p$. For a prediction of the IE 610a, the updated feature representation $f_i^p$ is passed through one or more fully connected layers, which predict an association between the element $a_i^p$ and the reference textrun 210. In some embodiments, this prediction of the IE 610a is used during training of IE 610a; for instance, during training, the prediction is compared to a correct indication of association, and the variance between the prediction and the correct indication is used to update the IE 610a. The IE 610a may use a single fully connected prediction layer with sigmoid activation, which gives a binary classification output (i.e., an indication of associated or not associated) as the association prediction (i.e., the predicted association). Additionally or alternatively, however, the association prediction could be a score, in which case the first analytics engine 140 could compare that score to a threshold to determine whether a candidate element is deemed associated with the reference textrun 210. In some embodiments, using an auxiliary branch helps in training the CNN features, which are used further in the FM 640a and in the SAM 650a.

At block 715, the process 700 involves processing each element (i.e., the candidate elements and the reference textrun 210 itself) to obtain a corresponding text embedding for that element. In some embodiments, the extraction system 100 processes each element $a_i^p$, specifically the text content $t_i^a$ of the element, to obtain its text embedding. A given element $a_i^p$ has text content $t_i^a$ that includes a set of words $\{w_{i,1}, w_{i,2}, \ldots, w_{i,n}\}$. In some embodiments, the text content was determined through OCR or some other inexact technique of determining text, and as such, these words may include noise, which makes the use of standard word vectors difficult. To mitigate this, an embodiment of the extraction system 100 obtains word embeddings, such as through the Python library chars2vec². For instance, in some embodiments, the extraction system 100 truncates the set of words to no more two hundred words and when applies chars2vec² to the set of words, resulting in an output of a 100-dimensional word embedding per element. The extraction system 100 replaces the words of each text content $t_i^a$ with the corresponding word embeddings to generate a sequence of word embeddings $\{we_{i,1}, we_{i,2}, \ldots, we_{i,n}\}$ per element. The extraction system 100 provides the word embedding of each element as input to the TE 620a.

At block 720, the TE 620a processes the word embeddings of the sequence of elements. In some embodiments the TE 620a is or includes an LSTM network, which may have a hidden state size of one hundred. The LSTM of the TE 620a processes the word embeddings such that the cell state $cs_i^t$ of the TE 620a after processing the word embeddings for an element is used as a text representation for that corresponding element. The textual representation for an element has a size of one hundred in some embodiments. In the case of a candidate element being a widget, the textual representation of that candidate element may be set to a vector of zeroes. The textual representation is passed through a fully connected layer, for instance, with a hundred units and ReLU activation, to obtain a textual representation $f_i^t$.

In some embodiments, an element $a_i^p$ is now associated with a corresponding textual representation $f_i^t$, as determined by the TE 620a, as well as being associated with spatial coordinates, in particular the normalized bounding box $bb_i^n$, and a text content. A binary flag $r_i$ indicates whether an element (i.e., the reference textrun $\alpha_0^p$ or a candidate element $\alpha_i^p$ for $i>0$) is the reference textrun 210 itself. Thus, in the sequence of elements, there is one corresponding $r_i$ that equals 1, and the remaining $r_i$ equal 0.

At block 725, the process 700 involves concatenating the normalized spatial coordinates, the textual representation, and $r_i$ for each element corresponding to the reference textrun 210 as well as for the reference textrun 210 itself. For instance, the result of the concatenation is $ce_i = bb_i^n \| f_i^t \| r_i$, where the operator $\|$ indicates concatenation. This results in a sequence $ce = \{ce_0, ce_1, ce_2, \ldots, ce_{k_1+k_2}\}$.

At block 730, the process 700 involves inputting this sequence of concatenated data determined at block 725 into the CE 630a, which produces a context-aware representation $b_i$ for each element based on the sequence of concatenated data. Thus, in some embodiments, the CE 630a, which can be Bi-LSTM based, takes a sequence of concatenated normalized spatial coordinates and text embedding to generate context-aware representations for each element. In some embodiments, the CE 630a includes a hidden size of 128 for both forward and backward LSTMs of the Bi-LSTM.

At block 735, the process 700 involves inputting each context-aware representation $b_i$ and corresponding initial feature representation $f_i^V$ into the FM 640a. In some embodiments, the FM 640a fuses these context-aware representations with the feature representation $f_i^V$ of the corresponding reference textrun 210, such as by using attention-based fusion. Specifically, for instance, an embodiment of the FM 640a uses $b_i$ as a 1×1 filter to perform two-dimensional convolution over the feature representation $f_i^V$. To this end, in one example, the size of the LSTMs in the CE 630a are configured to make the CE 630a compatible with C'. This results in a fused feature map with a single channel and with dimensions H'×W'. The extraction system 100 flattens the fused feature map to obtain $f_i^{fused}$ having H×W dimensions. In some embodiments, the flattened version $f_i^{fused}$ of the fused feature map is used in a decoder stage utilizing the SAM 650a.

At block 740, the process 700 involves selecting the first element in the sequence of elements that includes the reference textrun 210 and the candidate elements for the reference textrun 210. In some embodiments, as described above, the candidate elements (i.e., the nearby form elements) are sorted based on increasing distance from the reference textrun 210, and in that case, the first candidate element is the reference textrun 210 and the next one has the smallest such distance.

Block 745 begins an iterative loop in which each element is considered in turn and in which an association prediction is made regarding that element's association to the reference textrun 210. Specifically, at block 745, the process 700 involves, for that selected candidate element, concatenating the corresponding normalized spatial coordinates $bb_i''$, the fused feature map $f_i^{fused}$ and an association prediction for the prior element. Thus, in some embodiments, the result of the concatenation is $bb_i''\|f_i^{fused}\|pred_{i-1}$, where $pred_0$ is a default prediction used when the selected candidate element is the first in the sequence of elements. In some embodiments, the default prediction may be zero, or a vector of zeroes, which can enable the first analytics engine 140 to recognize that the association prediction for the prior element is not applicable in that case.

At block 750, the process 700 involves inputting the concatenation for the selected element, as determined at block 745, into the SAM 650a, such that the SAM generates and outputs an association prediction for the selected element. For instance, the association prediction may be binary (e.g., 0 or 1, FALSE or TRUE) or may be score-based (e.g., in the range of 0 to 1). In the latter case, the extraction system 100 may compare the score-based association prediction to a threshold to convert the score-based association prediction to a binary association prediction.

In some embodiments, the SAM 650a determines an association prediction, and thus predicts association, between the selected element and the reference textrun 210. An example of the SAM 650a is LSTM based and has a hidden size set to 1000 and an attention layer size of 500. Further, an embodiment of the SAM 650a includes a sequence-to-sequence (seq2seq) decoder used to predict association between the selected element $\alpha_i^p$ and the reference textrun 210, where the association prediction is sequentially conditioned on predictions made for previous candidates $\alpha_j^p$, where j<i. Some embodiments use the Bahdnau attention technique to make the SAM 650a attend on context memory M, where M is obtained by stacking CE inputs $\{b_1, b_2, \ldots, b_{k_1+k_2}\}$ columnwise. In one example, one or more fully connected prediction layers are used over the outputs of the SAM 650a, where those fully connected prediction layers can be similar to those used in the auxiliary branch of the IE 610a.

At decision block 755, the process 700 involves determining whether the selected element is the last element in the sequence of elements for the reference textrun 210. If the selected element is not the last element in the sequence, then at block 760, the process 700 selects the next element in the sequence and returns to block 745 for consideration of that newly selected element.

However, if at decision block 755 the selected element is the last element in the sequence of elements for the reference textrun 210, then at block 765, the process 700 outputs the various association predictions determined for the candidate elements. In some embodiments, this process 700 or similar is performed for each reference textrun 210. Thus, the extraction system 100 determines association predictions for each reference textrun 210, including a respective association prediction for each candidate element for the reference textrun 210.

Figure 8:
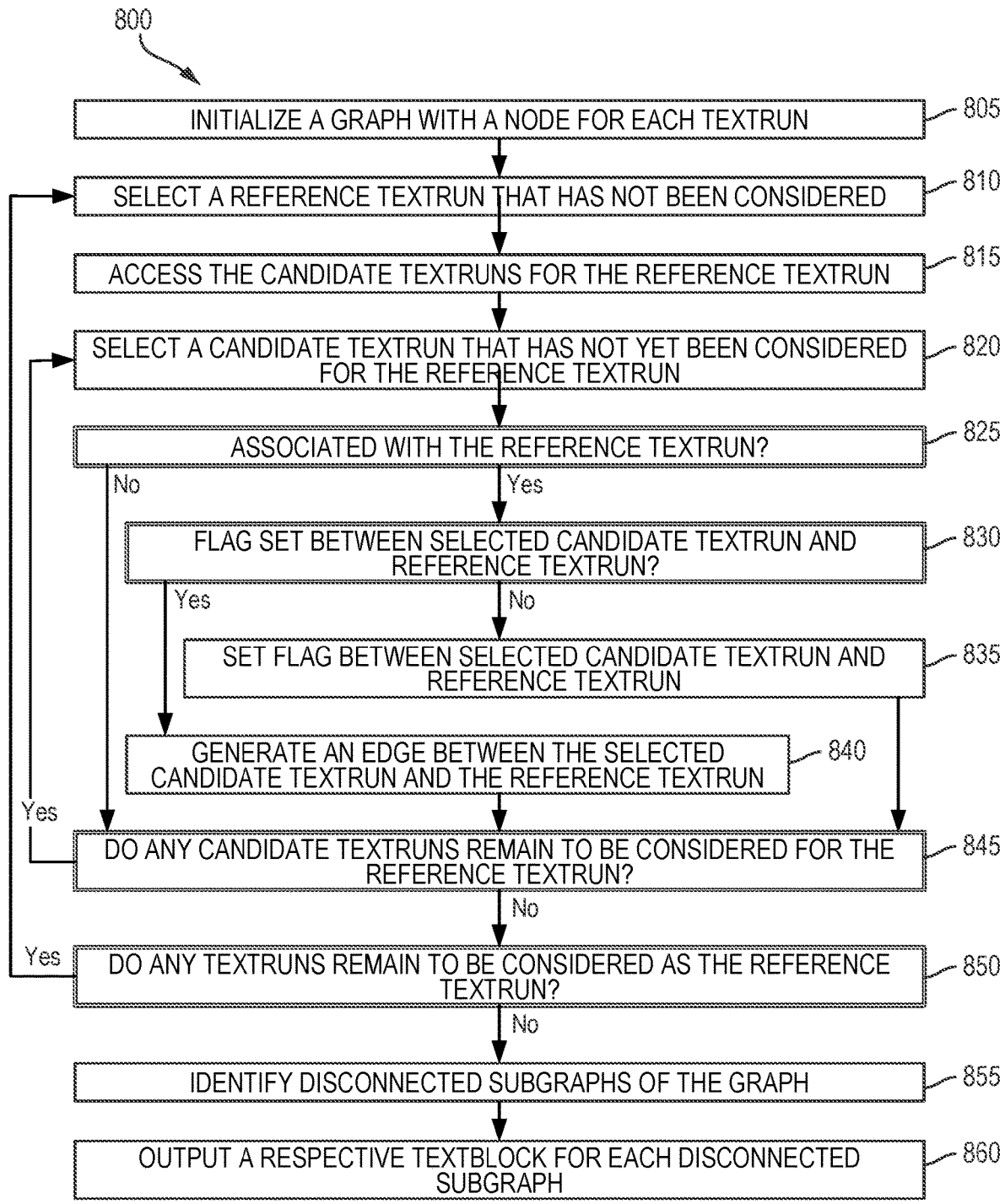
FIG. 8 is a diagram of an example of a process of using a graph to determine textblocks based on association predictions between textruns, according to some embodiments described herein.

Throughout the above processes, each textrun 210 acts as the reference textrun 210 and potentially acts as a candidate element for one or more other textruns 210. In some embodiments, the association subsystem 660a of the first analytics engine 140 determines textblocks 310 based on the prediction associations made for each textrun 210 (i.e., for each reference textrun 210). For instance, the association subsystem 660a determines that two textruns 210, a first textrun 210 and a second textrun 210, belong in the same textblock 310 if (e.g., if and only if) (a) the first textrun 210 was deemed associated with the second textrun 210 with the second textrun as the reference textrun 210 and the first textrun as a candidate element and (b) the second textrun 210 was deemed associated with the first textrun 210 with the first textrun 210 as the reference textrun 210 and the second textrun 210 as a candidate element. In some embodiments, this condition can be met only if the second textrun 210 was a candidate element (i.e., was a nearby form element) for the first textrun 210 and if the first textrun 210 was a candidate element (i.e., was a nearby form element) for the second textrun 210. Further, an embodiment of the association subsystem 660a includes in a textblock 310 each additional textruns 210, if any, that share such a relationship with the first textrun 210 or with the second textrun 210. Thus, in some embodiments, the association subsystem 660a groups textruns 210 into textblocks 310 such that any pair of textruns 210 meeting the above criteria, in which each is deemed associated with the other, are placed in the same textblock 310. Various techniques may be used based on the association predictions to identify textblocks 310 using this criteria; FIG. 8 illustrates a process 800 of utilizing one of such techniques.

FIG. 8 is a diagram of an example of a process 800 of using a graph to determine textblocks 310 based on association predictions between textruns 210, according to some embodiments described herein. An embodiment of the association subsystem 660a uses this process 800 or similar after having determined association predictions for each textrun 210 (i.e., for each reference textrun 210). Although FIG. 8 depicts various activities occurring in a particular sequence or order, this is not intended to be limiting. In certain embodiments, for instance, the activities may be performed in a different order, or one or more activities of the process 800 may be performed in parallel. In certain embodiments, the process 800 may be performed by the extraction system 100.

As shown in FIG. 8, at block 805, the process 800 involves initializing a graph and initializing other variables to be used in this process 800. In some embodiments, the graph a respective node corresponding to each textrun 210 of the static form 120. An embodiment of the association subsystem 660a initializes the graph with a node corresponding to each textrun 210 and with no edges in the graph.

In one example, each pair of textruns 210 represented by a pair of nodes is associated with a flag, which can potentially be set to either FALSE or TRUE. If the flag is set to TRUE, the corresponding pair of textruns 210 is deemed flagged or deemed to have its flag set. During initialization, each flag can be initially established to a value of FALSE, such that no flags are initially TRUE or deemed to be set. Further, in some embodiments, because the graph is undirected, each pair of textruns 210 associated with a flag is an unordered pair, such that the pair of Textrun A and Textrun B is the same as the pair of Textrun B and Textrun A. Thus, only a single flag is associated with a given combination of two textruns 210, and only a single edge can exist at a time for that pair.

Block 810 begins an iterative loop such that each iteration of the loop corresponds to a particular textrun 210. Specifically, at block 810, the process 800 involves selecting from the textruns 210 of the static form 120 a reference textrun 210 that has not been considered in this process 800.

At block 815, the process 800 involves accessing the candidate textruns 210 (i.e., the candidate elements that are textruns 210) for the reference textrun 210. In some embodiments, each candidate textrun 210 is already assigned an association prediction with respect to the reference textrun 210. As described above, such association predictions were output by the first analytics engine 140 in some embodiments. Block 820 begins an inner iterative loop in which a respective candidate textrun 210 is considered during each iteration. Specifically, at block 820, the process 800 involves selecting a candidate textrun 210 that has not yet been considered for the reference textrun 210.

At decision block 825, the process 800 involves determining whether the selected candidate textrun 210 is deemed associated with the reference textrun 210 according to the association prediction made for the selected candidate textrun 210 with respect to the reference textrun 210. If the selected candidate textrun 210 is deemed associated with the reference textrun 210, then the process 800 proceeds to decision block 830. However, if the candidate textrun 210 is deemed not associated with the reference textrun 210 based on the applicable association prediction, then the process 800 skips ahead to decision block 845.

At decision block 830, the process 800 involves determining whether the pair of the reference textrun 210 and the selected candidate textrun 210 has a flag that is set. If the flag is not set, then at block 835, the process 800 involves setting the flag for the reference textrun 210 and the selected candidate textrun 210 and then skipping ahead to decision block 845. However, if the flag is set for this pair of textruns 210, then at block 840, the process 800 involves generating an edge between the reference textrun 210 and the selected candidate textrun 210 and then proceeding to decision block 845.

At decision block 845, regardless of whether the selected candidate textrun 210 is deemed associated with the reference textrun 210, the process 800 involves determining whether any candidate textruns 210 remain to be considered for the reference textrun 210. If such a candidate textrun 210 remains, then the process 800 returns to block 820 to select another candidate textrun 210. However, if no more candidate textruns 210 remain for consideration with respect to the reference textrun 210, then the process 800 continues to decision block 850.

At decision block 850, the process 800 involves determining whether any textruns 210 remain to be considered as the reference textrun 210. If such a textrun 210 remains, then the process 800 returns to block 810 to select another textrun 210 as the reference textrun 210. However, if no more textruns 210 remain for consideration, then the process 800 continues to block 855.

At block 855, the process 800 involves identifying each disconnected subgraph of the graph. Generally, a disconnected subgraph is a graph that includes a set a nodes and edges, such that no edge connects a node in the disconnected subgraph to another node outside the disconnected subgraph. In other words, each disconnected subgraph is a self-contained group of nodes, representing textruns 210, and edges between pairs of such nodes. Various techniques exist for identifying disconnected subgraphs, and one or more of such techniques can be used by embodiments described herein. In some embodiments, for each disconnected subgraph, the association subsystem 660a defines a textblock 310 to include each textrun 210 represented by a respective node in that disconnected subgraph. A disconnected subgraph can include one or multiple nodes, and thus a resulting textblock 310 can include one or multiple textruns 210.

At block 860, the process 800 involves outputting a set of textblocks 310, including a respective textblock 310 corresponding to each disconnected subgraph. For instance, for each disconnected subgraph, an embodiment of the association subsystem 660a outputs an indication of the set of textruns 210 represented by nodes in the disconnected subgraph.

In some embodiments, before the first analytics engine 140 is used in operation to determine textblocks 310 based on textruns 210 and widgets 220, some embodiments of the training system 160 train the first analytics engine 140 and, specifically, the one or more prediction models of the first analytics engine 140 to perform the task of determining textblocks 310 based on textruns 210 and widgets 220.

In some embodiments, the training system 160 trains the prediction models of the first analytics engine 140, such as the IE 610a, the TE 620a, the CE 630a, the FM 640a, and the SAM 650a, in an end-to-end manner. In other words, the prediction models are trained in a manner such that the prediction models have with one another the same relationship that they have during operation. For instance, each sample of training data used to train the prediction models is an input data subset corresponding to a sample textrun 210, such that the input data subset is used through the various prediction models during training. In some embodiments, the training data includes multiple training samples, and each training sample includes data related a particular textrun 210 as a reference textrun 210. For instance, a training sample includes a sequence of image patches $im^p = \{im_1^p, im_2^p, \ldots, im_{k_1+k_2}^p\}$, a sequence of text contents $t^a=\{t_1^a, t_2^a, \ldots, t_{k_1+k_2}^a\}$, and a sequence of normalized bounding boxes $bb^n=\{bb_1^n, bb_2^n, \ldots, bb_{k_1+k_2}^n\}$.

In some embodiments, the training system 160 uses binary cross entropy (BCE) loss over binary association predictions made by the auxiliary branch of the IE 610*a*, $BCE_{conv}^{TB}$, and sequential predictions made by the SAM 650*a*, $BCE_{seq}^{TB}$, to train the network of prediction models in the first analytics engine 140. Thus, an example of the training system 160 uses the following loss function to train these prediction models of the first analytics engine 140:

$$loss_1 = BCE_{conv}^{TB} + BCE_{seq}^{TB}$$

Some embodiments of the training system 160 may use binary cross entropy loss to update parameters of the prediction models in the first analytics engine 140 by computing the gradient of the loss function with respect to various parameters. The specific loss functions used may vary across the prediction models. Further, an example of the training system 160 use Adam Optimizer at a learning rate of $1 \times 10^{-4}$ and a batch size of 8.

Figure 9:
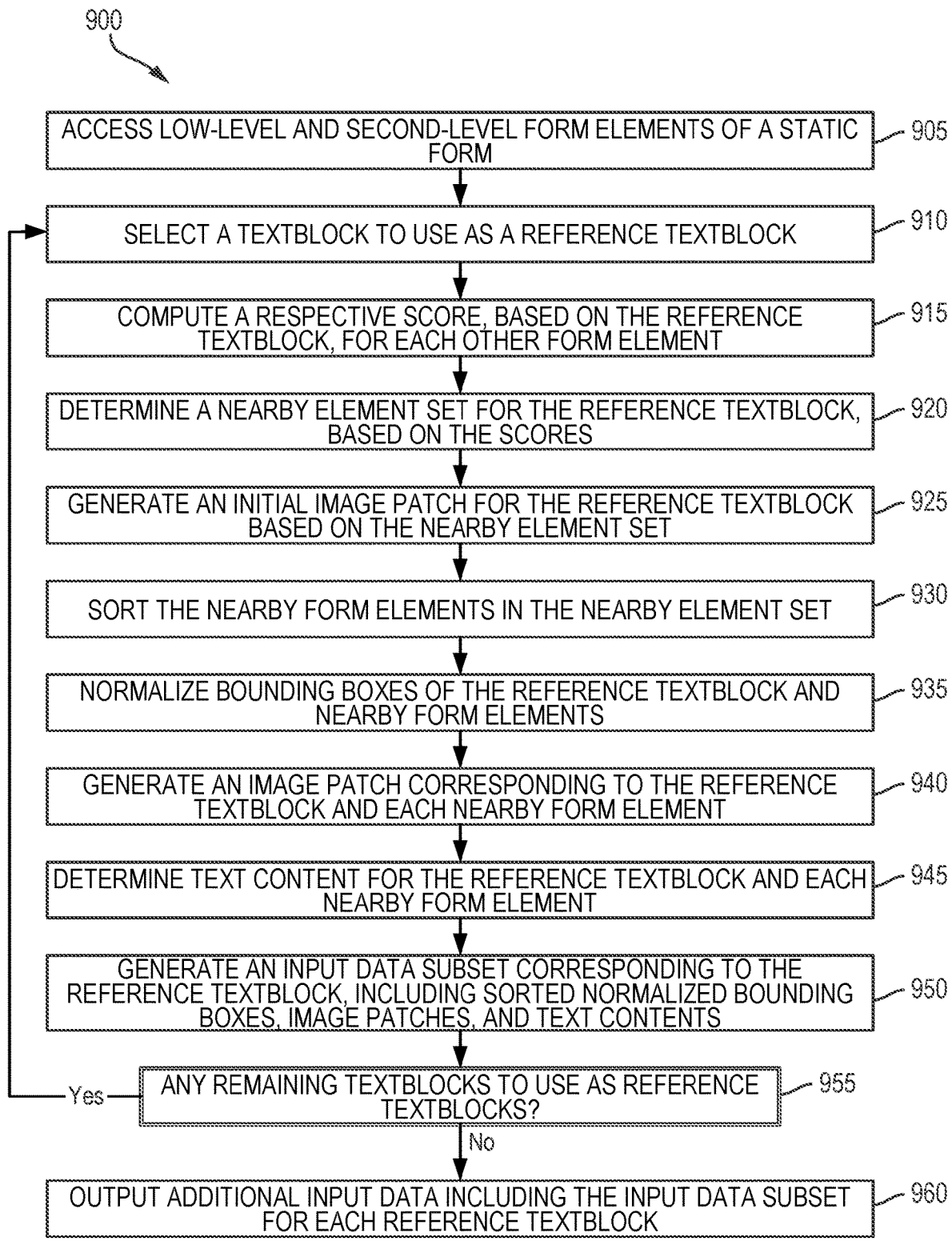
FIG. 9 is a diagram of an example of a process of generating additional input data for use by a second analytics engine of the extraction system, according to some embodiments described herein.

FIG. 9 is a diagram of an example of a process 900 of generating additional input data for use by the second analytics engine 145, according to some embodiments described herein. The additional input data may be based on the determination of textblocks 310 as predicted by the first analytics engine 140. For instance, in some embodiments, the input-generation subsystem 130 of the extraction system 100 executes this process 900 or similar at block 420 of the above process 400, in preparation for sending data to the second analytics engine 145. As mentioned above, some embodiments of the second analytics engine 145 determine high-level form elements from textblocks 310 and widgets 220. The second analytics engine 145 includes a series of prediction models that take various inputs, with each prediction model in the series taking input that relies on the additional input data generated in this process 900 or on output of one or more prior prediction models in the series. Although FIG. 9 depicts various activities occurring in a particular sequence or order, this is not intended to be limiting. In certain embodiments, for instance, the activities may be performed in a different order, or one or more activities of the process 900 may be performed in parallel. In certain embodiments, the process 900 may be performed by the extraction system 100.

At block 905, the process 900 involves accessing the second-level form elements and low-level form elements, such as textblocks 310 and widgets 220. For instance, as described above, the textblocks 310 may have been predicted by the first analytics engine 140, and widgets 220 may have been extracted from the static form 120.

Block 910 of the process 900 begins an iterative loop in which each iteration of the loop corresponds to a textblock 310 accessed at block 905 (i.e., a textblock 310 previously determined). During the loop, an input data subset is generated to be included in the additional input data that will be provided to the second analytics engine 145. Thus, at block 910, the process 900 involves selecting a textblock 310 that has not yet been considered and setting that textblock 310 as a current reference textblock 310.

At block 915, the process 900 involves assigning a proximity score to each form element accessed at block 905 (e.g., each textblock 310 and each widget 220) other than the reference textblock 310 itself. For instance, the proximity score may be based on a scoring function that takes as input a form element and outputs a score, or distance, indicating proximity to the reference textblock 310.

For instance, suppose T is the set of textblocks 310 predicted, and W is the set of widgets 220. Given a reference textblock $t \in T$, and given another form element $e \in E$, which can be either a textblock 310 or a widget 220, an example of the scoring function assigns the following score to the form element e with respect to the selected textblock t:

$$s(t, e) = \alpha \times \min\left(\left|y_t - \left(y_e - \frac{h_e}{2}\right)\right|, |y_t - y_e|, \left|y_t - \left(y_e + \frac{h_e}{2}\right)\right|\right) + \beta \times \min\left(\left|x_t - \left(x_e - \frac{w_e}{2}\right)\right|, |x_t - x_e|, \left|x_t - \left(x_e + \frac{w_e}{2}\right)\right|\right)$$

In the above, $x_t$ and $y_t$ are respectively the x- and y-coordinates of the midpoint of a bounding box (e.g., the minimum bounding box) of the reference textblock t; $w_t$ and $h_t$ are respectively the width and height of that bounding box of the reference textblock t; $x_e$ and $y_e$ are respectively the x- and y-coordinates of the midpoint of a bounding box (e.g., the minimum bounding box) of the form element e; and $w_e$ and $h_e$ are respectively the width and height of that bounding box of the form element e. In some embodiments, as in this example scoring function, for both the x- and y-dimensions, proximity can be determined based on the distance between midpoints of the reference textblock 310 versus the other form elements or based on the distance of the midpoint of the reference textblock 310 to either extreme end (e.g., leftmost or rightmost in the x-dimension or top or bottom in the y-dimension), depending on which yields a minimal distance.

Additionally, in the above example scoring function, the scalars $\alpha$ and $\beta$ are weighting factors indicating the importance of vertical closeness, corresponding to the scalar $\alpha$, versus horizontal closeness, corresponding to the scalar $\beta$. In one example, $\alpha=10$ and $\beta=1$, giving ten times greater weight to vertical proximity, because testing has shown that vertical proximity is a better indicator of a relationship between form elements as compared to horizontal proximity.

At block 920, the process 900 involves determining a nearby element set, $e^p$, for the reference textblock 310, where the nearby element set is a set of second-level or low-level form elements deemed to be close (e.g., closest based on the scoring function) to the reference textblock 310. In some embodiments, the extraction system 100 selects the $k_1$ highest ranked, or lowest scoring, textblocks 310 and the $k_2$ highest ranked, or lowest scoring, widgets 220. For instance, in some embodiments, $k_1=10$ and $k_2=4$. In other words, an embodiment of the extraction system 100 ranks the form elements based on their scores, as assigned in block 915. If the scoring function assigns relatively low scores to close form elements, as in the above example scoring function, then the form elements could be ranked from lowest scoring to highest scores; however, if a different scoring function than above is used and that scoring function assigns relatively high scores to close form elements, the form elements could be ranked from highest scoring to lowest scoring. In either case, the nearby element set may include form elements deemed to be closest to the reference textblock 310 and further may include a predetermined number of textblocks 310 deemed to be the closest textblocks 310 and a predetermined number of widgets 220 deemed to be the closest widgets 220.

At block 925, the process 900 involves generating an initial image patch, p, representing a portion of the static form 120 enclosed by a united bounding box corresponding to the reference textblock 310. In some embodiments, the extraction system 100 determines the united bounding box as the union of the bounding boxes of the form elements in the nearby element set $\alpha^p$. This united bounding box defines the boundaries of the initial image patch, which includes the reference textblock 310 as well as the form elements in the nearby element set. Further, in some embodiments, the extraction system 100 highlights the reference textblock 310 in the initial image patch, such as by drawing a rectangular outline around the reference textblock 310. For instance, the rectangular outline may be provided in a color (e.g., blue) to provide distinction from the rest of the initial image patch.

At block 930, the process 900 involves sorting the nearby form elements (i.e., the form elements in the nearby element set) based on natural reading order. For instance, in some embodiments, the extraction system 100 sorts (i.e., orders) the nearby form elements based on natural reading order. For instance, in a left-to-right language, such as English, a natural reading order is from top to bottom in horizontal scan lines from left to right. In one example, each nearby form element is deemed located at the point at the upper left of its bounding box, and thus, an example of the extraction system 100 scans left to right in rows from top to bottom, while adding a form element to the order when the upper-left corner of that form element is encountered. This results in an ordered set, or sequence, of form elements in the nearby element set as follows, when the nearby element set includes the $k_1$ textblocks 310 and the $k_2$ widgets 220 that are included in the initial image patch p corresponding to the reference textblock 310: $\alpha^p = \{a_0^p, a_1^p, a_2^p, \ldots, a_{k_1+k_2}^p\}$. In the set $\alpha^p$, the zeroth element $a_0^p$ is the reference textblock 310 itself.

Each nearby form element has a bounding box, as mentioned above, such as a minimum bounding box. An embodiment of the extraction system 100 determines an ordered set of bounding boxes, where each bounding box corresponds to a respective nearby form element and where the set is sorted according to the order determined for the nearby form elements. In other words, an example of the ordered set (i.e., the sequence) of bounding boxes is $bb^a = \{bb_0^a, bb_1^a, bb_2^a, \ldots, bb_{k_1+k_2}^a\}$, where $bb_0^a$ is the bounding box of the reference textblock 310, and each other $bb_i^a$ is the bounding box of the nearby form element $a_i^p$ in the initial image patch p that corresponds to the reference textblock 310. Each bounding box $bb_i^a$ in the sequence can be represented as $bb_i^a = \{x_i^a, y_i^a, w_i^a, h_i^a\}$, where $x_i^a$ and $y_i^a$ are the respective x- and y-coordnates of the top-left corner of the bounding box, and where $w_i^a$ and $h_i^a$ are the respective width and height of the bounding box.

At block 935, the process 900 involves normalizing the bounding boxes in the sequence. In some embodiments, the extraction system 100 normalizes the bounding boxes in the range of [0, 1], inclusive, based on the size of the united bounding box corresponding to the reference textblock 310. For instance, the coordinates $(x_i^a, y_i^a)$ of a bounding box of an element $a_i^p$ are normalized to a range of [0, 1] based on the width and height of the initial image patch p corresponding to the reference textblock 310, and the width and height $(w_i^a, h_i^a)$ are normalized to a range of [0, 1] to represent the fractions of the wdth and height of the initial image patch p. The result is an ordered set of normalized bounding boxes $bb'' = \{bb_1'', bb_2'', \ldots, bb_{k_1+k_2}''\}$, where $bb_0''$ is the normalized bounding box of the reference textblock 310.

At block 940, the process 900 involves generating an image patch, based on the initial image patch p, for each nearby form element and the reference textblock 310. As described above, the initial image patch corresponding to the reference textblock 310 is a rectangular portion of the static form 120 that corresponds to a united bounding box including the various bounding boxes of the nearby form elements. In some embodiments, the extraction system 100 generates a respective image patch for each nearby form element, where the respective image patches are based on the initial image patch for the reference textrun 210. For the reference textrun $\alpha_0^p$, the respective image patch may be set equal to the initial image patch. For a given nearby form element $\alpha_i^p$, for i>0, the respective image patch is the initial image patch with the bounding box $bb_i^a$ of the nearby form element highlighted, for instance, such that a rectangular outline representing the bounding box appears in the image patch. For instance, the rectangular outline may be in a color (e.g., green) other than the color in which the reference textblock 310 is outlined. An embodiment of the extraction system 100 resizes each such image patch to H×W and concatenates a normalized two-dimensional mesh grid of that same resolution to the image patch to obtain a five-channel image (i.e., three color channels and two channels for the two-dimensional mesh grid). For example, H=160 and W=640.

In some embodiments, the extraction system 100 orders the image patches, modified as described above, based on the order determined above for the nearby form elements. Thus, the ordered set of image patches are $im_p^f = \{im_0^p, im_1^p, im_2^p, \ldots, im_{k_1+k_2}^p\}$, where $im_0^p$ is the initial image patch modified as described above and where each other such image patch $im_i^p$ corresponds to a nearby form element of the reference textblock 310 and has that nearby form element highlighted.

At block 945, the process 900 involves determining text content of the nearby form elements for the reference textblock 310. For instance, each textblock 310 and each widget 220 in the nearby element set may include text content, such that text content $t_i^a$ is the text content of an element $\alpha_i^p$. In some embodiments, similar to the normalized bounding boxes and the image patches, the text contents form an ordered set, $\{t_0^a, t_1^a, t_2^a, \ldots, t_{k_1+k_2}^a\}$, corresponding to the order of the nearby form elements with $t_0^a$ being the text content of the reference textblock 310.

At block 950, the process 900 involves generating an input data subset to be included in additional input data that will be provided to the second analytics engine 145. In some embodiments, the input data subset includes the ordered sets of normalized bounding boxes, image patches, and text contents corresponding to the reference textblock 310.

At decision block 955, the process 900 involves determining whether any textblocks 310 remain to be considered as the reference textblock 310. If such a textblock 310 remains, then the process 900 returns to block 910 to select another textblock 310 as the reference textblock 310. However, if no such textblocks 310 remain to be considered, then at block 960, the process 900 involves outputting the additional input data that includes each input data subset determined for each textblock 310.

Figure 10:
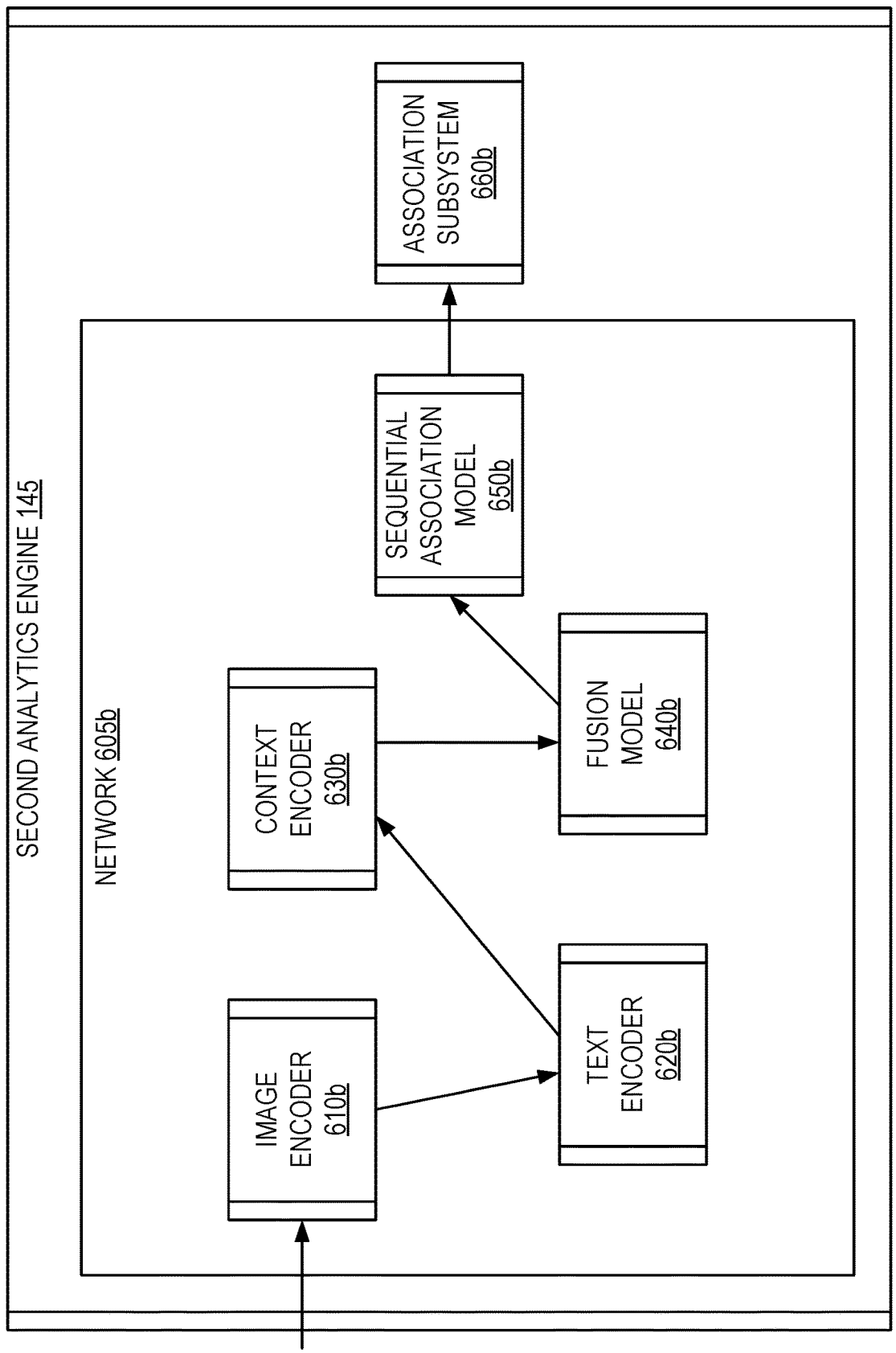
FIG. 10 is a diagram of an example of the second analytics engine, according to some embodiments described herein.

FIG. 10 is a diagram of an example of the second analytics engine 145, according to some embodiments described herein. In some embodiments, the second analytics engine 145 determines high-level form elements based on textblocks 310 and widgets 220; more specifically, an example of the second analytics engine 145 combines textblocks 310 and widgets 220 into high-level form elements based on the textblocks 310 and the widgets 220, such that the resulting number of high-level form elements is no greater than the number of textblocks 310 predicted plus the number of widgets 220 in the static form 120. For instance, the high-level form elements predicted may include one or more of the following: textblocks 310, text fields 320, choice fields 330, and choice groups 340.

In some embodiments, the second analytics engine 145 includes a network 605b one or more prediction models. As shown in FIG. 10, an example of the second analytics engine 145 includes one or more of (e.g., all of) the following prediction models: an IE 610b, a TE 620b such as an LSTM-based text encoder, a CE 630b such as a Bi-LSTM context encoder, a FM 640b, and a SAM 650b such as an LSTM-based sequential association model. Further, in an example second analytics engine 145, the predictions models have the same architectures as their counterparts in the first analytics engine 140 but are trained separately to achieve a different task (e.g., to predict high-level form elements from textblocks 310 and widgets 220). In some embodiments, the second analytics engine 145 takes, as input, data describing the textblocks 310 and widgets 220. More specifically, an embodiment of the second analytics engine 145 takes, as input, additional input data that includes various input data subsets, each input data subset including ordered sets of normalized bounding boxes, image patches, and text contents corresponding to a respective reference textblock 310 for the input data subset.

In some embodiments, the sequence of the IE 610b, the TE 620b, the CE 630b, the FM, and the SAM 650b outputs a set of association predictions, which indicate associations between each reference textblock 310 and its corresponding nearby form elements. The second analytics engine 145 further includes an association subsystem 660b, which predicts high-level form elements based on the association predictions for the various reference textblocks 310.

Each of the IE 610b, the TE 620b, the CE 630b, the FM 640b, the SAM 650b, and the association subsystem 660b can be implemented in hardware, software, or a combination of both. For instance, each such component can be one or more software methods, one or more specialized hardware devices, or some combination of these or other hardware or software. Further, although the IE 610b, the TE 620b, the CE 630b, the FM 640b, the SAM 650b, and the association subsystem 660b are described herein as being distinct, it will be understood that this distinction is made for illustrative purposes only. For instance, one or more of these components may be combined into common software, common hardware, or a combination of both.

Figure 11:
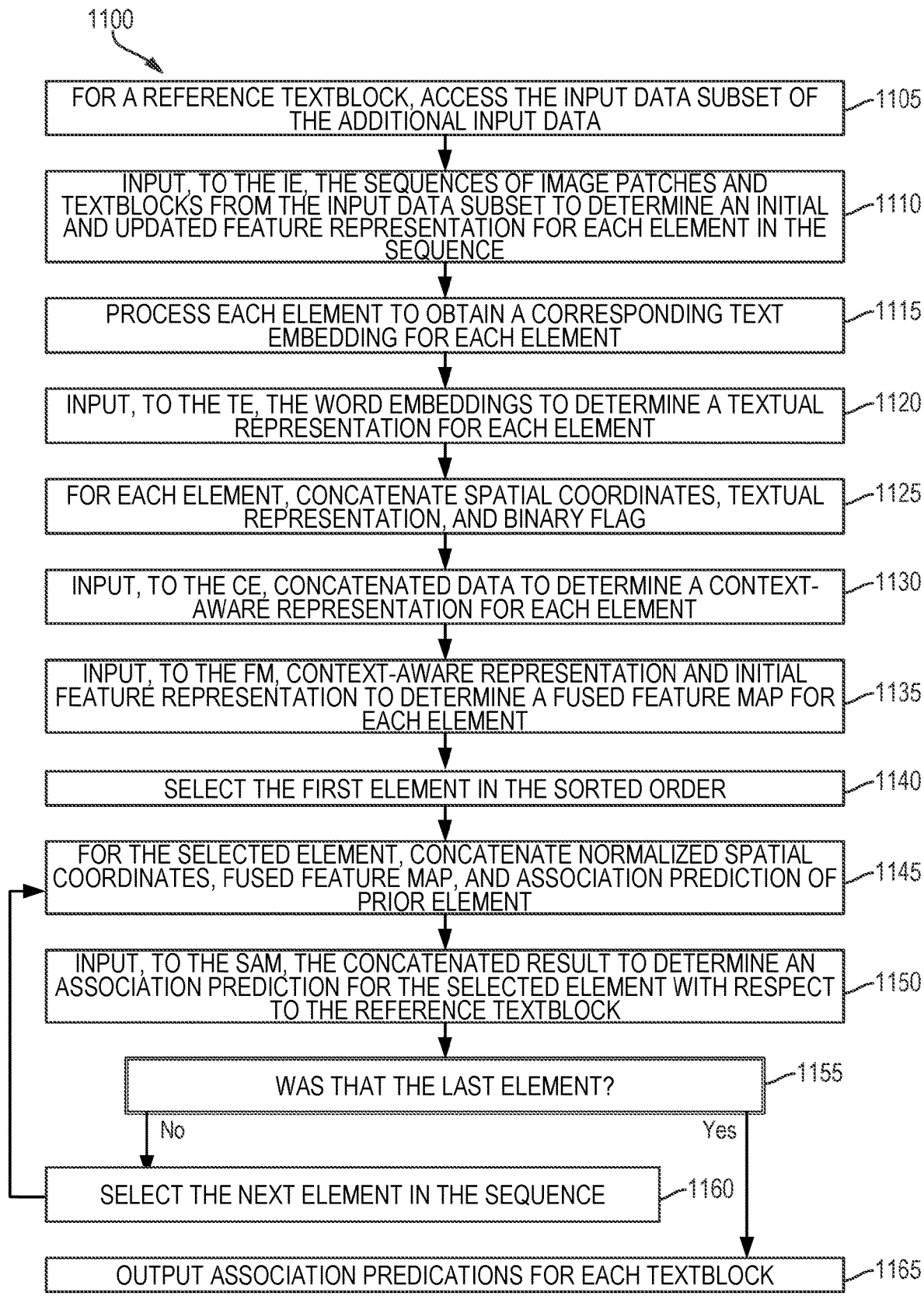
FIG. 11 is a diagram of an example of a process of using the second analytics engine to determine association predictions for a reference textblock, according to some embodiments described herein.

FIG. 11 is a diagram of an example of a process 1100 of using the second analytics engine 145 to determine association predictions for a reference textblock 310, according to some embodiments described herein. In some embodiments, the extraction system 100 performs this process 1100 or similar for each textblock 310, so as to determine association predictions between each reference textblock 310 and its nearby form elements, which are now treated as candidate elements that potentially have associations with the reference textblock 310. Although FIG. 11 depicts various activities occurring in a particular sequence or order, this is not intended to be limiting. In certain embodiments, for instance, the activities may be performed in a different order, or one or more activities of the process 1100 may be performed in parallel. In certain embodiments, the process 1100 may be performed by the extraction system 100.

As shown in FIG. 11, at block 1105, the process 1100 involves, for the reference textblock 310, accessing the input data subset corresponding to the reference textblock 310 in the additional input data. For instance, the input data subset includes, for the reference textblock 310, the corresponding sequence of image patches $im^p = \{im_0^p, im_1^p, im_2^p, \ldots, im_{k_1+k_2}^p\}$, with each $im_i^p$ for $i>0$ corresponding to a respective candidate element (i.e., each respective nearby form element) and having that respective candidate element highlighted in addition to the reference textblock 310 being highlighted, and with $im_0^p$ having only the reference textblock 310 highlighted; the corresponding sequence of text contents $t^a = \{t_0^a, t_1^a, t_2^a, \ldots, t_{k_1+k_2}^a\}$, with each $t_0^a$ being the text content of the reference textblock 310 and with $t_i^a$ for $i>0$ being the text content of a respective candidate element; and the corresponding sequence of normalized bounding boxes $bb'' = \{bb_1'', bb_2'', \ldots, bb_{k_1+k_2}''\}$, with $bb_0''$ being the normalized bounding box of the reference textblock 310 and with each $bb_i''$ for $i>0$ being the normalized bounding box of a respective candidate element.

At block 1110, the process 1100 involves inputting the sequence of image patches and the sequence of text contents into the IE 610b. As described below, in some embodiments, the IE 610b inputs each image patch $im_i^p$ described above and generates a corresponding feature representation using a CNN.

In some embodiments, each image patch in the sequence has dimensions H×W×5, as described above. An embodiment of the IE 610b processes the sequence of image patches through the CNN. In some embodiments, the CNN of the IE 610b has $n_{cb}$ convolution blocks; for instance, $n_{cb}$=5. A convolution block $cb_j$ includes $n_j^{cl}$ convolution layers, each having $f_j$ filters with kernel size $k_j \times k_j$ and a stride of 1. For example, $[n_j^{cl}]_{j=1,2,3,4,5}$=[2,2,3,3,3]; $[f_j]_{j=1,2,3,4,5}$=[32,64,96, 128,256]; and $[k_j]_{j=1,2,3,4,5}$=[5,3,3,3,3].

In some embodiments, the IE 610b applies, in the CNN, a maxpooling layer to each image patch after each convolution block to generate an initial feature representation. An example of the maxpooling layer has a kernel size of 3×3 and a stride of 2. An embodiment of the CNN outputs, for each image patch and thus for each element associated with the reference textblock 310 (i.e., the candidate elements for the reference textrun 210 as well as the reference textblock 310 itself), an initial feature representation $f_i^V$ of output size H'×W'×C', where C' is the number of feature maps in the CNN. For instance, in some embodiments, H'=5, W'=20, and C'=256. As discussed below, this initial feature representation $f_i^V$ is used by the FM 640b.

In an auxiliary branch, an embodiment of the IE 610b passes a flattened initial feature representation $f_i^V$ through a fully convolutional network (FCN) in which, for example, all convolution layers have rectified linear unit (ReLU) activation. An example of the FCN includes two fully connected layers, each having $FC_c$ units. For instance, in some embodiments, $FC_c$=1024. The FCN thus updates the feature representation to provide an updated feature representation $f_i^p$ for a given image patch $im_i^p$. For a prediction of the IE 610b, the updated feature representation $f_i^p$ is passed through one or more fully connected layers, which predict an association between the element $a_i^p$ and the reference textblock 310. In some embodiments, this prediction of the IE 610b is used during training of IE 610b; for instance, during training, the prediction is compared to a correct indication of association, and the variance between the prediction and the correct indication is used to update the IE 610b. The IE 610b may implement multi-way classification (i.e., classification into more than two classes). For example, the IE 610b uses two fully connected prediction layers with softmax activation, which can perform a three-way classification. A first fully connected prediction layer can classify the candidate element as part of a text field with the reference textblock 310, part of a choice field 330 with the reference textblock 310, or unrelated to the reference textblock 310; and a second fully connected layer can indicate a binary classification of whether the candidate element can be further grouped into a choice group 340 with the reference textblock 310. In some embodiments, using an auxiliary branch helps in training the CNN features, which are used further in the FM 640*b* and in the SAM 650*b*.

At block 1115, the process 1100 involves processing each element (i.e., the candidate elements and the reference textblock 310 itself) to obtain a corresponding text embedding for that element. In some embodiments, the extraction system 100 processes each element $\alpha_i^p$, specifically the text content $t_i^a$ of the element, to obtain its text embedding. A given element $\alpha_i^p$ has text content $t_i^a$ that includes a set of words $\{w_{i,1}, w_{i,2}, \ldots, w_{i,n}\}$. In some embodiments, the text content may include noise, which makes the use of standard word vectors difficult. To mitigate this, an embodiment of the extraction system 100 obtains word embeddings, such as through the Python library chars2vec². For instance, in some embodiments, the extraction system 100 truncates the set of words to no more two hundred words and when applies chars2vec² to the set of words, resulting in an output of a 100-dimensional word embedding per element. The extraction system 100 replaces the words of each text content $t_i^a$ with the corresponding word embeddings to generate a sequence of word embeddings $\{we_{i,1}, we_{i,2}, \ldots, we_{i,n}\}$ per element. The extraction system 100 provides the word embedding of each element as input to the TE 620*b*.

At block 1120, the TE 620*b* processes the word embeddings of the sequence of elements. In some embodiments the TE 620*b* is or includes an LSTM network, which may have a hidden state size of one hundred. The LSTM of the TE 620*b* processes the word embeddings such that the cell state $cs_i^t$ of the TE 620*b* after processing the word embeddings for an element is used as a text representation for that corresponding element. The textual representation for an element has a size of one hundred in some embodiments. In the case of a candidate element being a widget, the textual representation of that candidate element may be set to a vector of zeroes. The textual representation is passed through a fully connected layer, for instance, with a hundred units and ReLU activation, to obtain a textual representation $f_i^t$.

In some embodiments, an element $\alpha_i^p$ is now associated with a corresponding textual representation $f_i^t$, as determined by the TE 620*b*, as well as being associated with spatial coordinates, in particular the normalized bounding box $bb_i^n$, and a text content. A binary flag $r_i$ indicates whether an element (i.e., the reference textblock $\alpha_0^p$ or a candidate element $\alpha_i^p$ for i>0) is the reference textblock 310 itself. Thus, in the sequence of elements, $\alpha_i$, there is one corresponding $r_i$ that equals 1, and the remaining $r_i$ equal 0.

At block 1125, the process 1100 involves concatenating the spatial coordinates, the textual representation, and $r_i$ for each element corresponding to the reference textblock 310 as well as for the reference textblock 310 itself. For instance, the result of the concatenation is $ce_i = bb_i^n \| f_i^t \| r_i$, where the operator ∥ indicates concatenation. This results in a sequence $ce = \{ce_0, ce_1, ce_2, \ldots, ce_{k_1+k_2}\}$.

At block 1130, the process 1100 involves inputting this sequence of concatenated data determined at block 1125 into the CE 630*b*, which produces a context-aware representation $b_i$ for each element based on the sequence of concatenated data. Thus, in some embodiments, the CE 630*b*, which can be Bi-LSTM based, takes a sequence of concatenated normalized spatial coordinates and text embedding to generate context-aware representations for each element. In some embodiments, the CE 630*b* includes a hidden size of 128 for both forward and backward LSTMs of the Bi-LSTM.

At block 1135, the process 1100 involves inputting each context-aware representation $b_i$ and corresponding initial feature representation $f_i^V$ into the FM 640*b*. In some embodiments, the FM 640*b* fuses these context-aware representations with the feature representation $f_i^V$ of the corresponding reference textblock 310, such as by using attention-based fusion. Specifically, for instance, an embodiment of the FM 640*b* uses $b_i$ as a 1×1 filter to perform two-dimensional convolution over the feature representation $f_i^V$. To this end, in one example, the size of the LSTMs in the CE 630*b* are configured to make the CE 630*b* compatible with C'. This results in a fused feature map with a single channel and with dimensions H'×W'. The extraction system 100 flattens the fused feature map to obtain $f_i^{fused}$ having H×W dimensions. In some embodiments, the flattened version $f_i^{fused}$ of the fused feature map is used in a decoder stage utilizing the SAM 650*b*.

At block 1140, the process 1100 involves selecting the first element in the sequence of elements that includes the reference textblock 310 and the candidate elements for the reference textblock 310. In some embodiments, as described above, the candidate elements (i.e., the nearby form elements) are sorted based on increasing distance from the reference textblock 310, and in that case, the first candidate element is the reference textblock 310 and the next one has the smallest such distance.

Block 1145 begins an iterative loop in which each element is considered in turn and in which an association prediction is made regarding that element's association to the reference textblock 310. Specifically, at block 1150, the process 1100 involves, for that selected candidate element, concatenating the corresponding normalized spatial coordinates $bb_i^n$, the fused feature map $f_i^{fused}$, and an association prediction for the prior element. Thus, in some embodiments, the result of the concatenation is $bb_i^n \| f_i^{fused} \| pred_{i-1}$, where $pred_0$ is a default prediction used when the selected candidate element is the first in the sequence of elements. In some embodiments, the default prediction may be zero, or a vector of zeroes, which can enable the second analytics engine 145 to recognize that the association prediction for the prior element is not applicable in that case.

At block 1150, the process 1100 involves inputting the concatenation for the selected element, as determined at block 1145, into the SAM 650*b*, such that the SAM generates and outputs an association prediction for the selected element.

In some embodiments, the SAM 650*b* determines an association prediction, and thus predicts association, between the selected element and the reference textblock 310. An example of the SAM 650*b* is LSTM based and has a hidden size set to 1000 and an attention layer size of 500. Further, an embodiment of the SAM 650*b* includes a seq2seq decoder used to predict association between the selected element $a_i^p$ and the reference textblock 310, where the association prediction is sequentially conditioned on predictions made for previous candidates $\alpha_j^p$, where j<i. Some embodiments use the Bahdnau attention technique to make the SAM 650*b* attend on context memory M, where M is obtained by stacking CE inputs $\{b_1, b_2, \ldots, b_{k_1+k_2}\}$ columnwise.

In one example, one or more fully connected prediction layers are used over the outputs of the SAM 650*b*, where those fully connected prediction layers can be similar to those used in the auxiliary branch of the IE 610*b*. In one example, for instance, the SAM 650*b* includes two fully connected prediction layers. A first fully connected prediction layer predicts whether the candidate element is part of a text field with the reference textblock 310, part of a choice field with the reference textblock 310, or unrelated to the reference textblock 310. A second fully connected prediction layer predicts whether the candidate element is part of a choice group 340 with the reference textblock 310.

At decision block 1155, the process 1100 involves determining whether the selected element is the last element in the sequence of elements for the reference textblock 310. If the selected element is not the last element in the sequence, then at block 1160, the process 1100 selects the next element in the sequence and returns to block 1145 for consideration of that newly selected element.

However, if at decision block 1155 the selected element is the last element in the sequence of elements for the reference textblock 310, then at block 1165, the process 1100 outputs the various association predictions determined for the candidate elements. In some embodiments, this process 1100 or similar is performed for each reference textblock 310. Thus, the extraction system 100 determines association predictions for each reference textblock 310, including a respective association prediction for each candidate element for the reference textblock 310.

Figure 12:
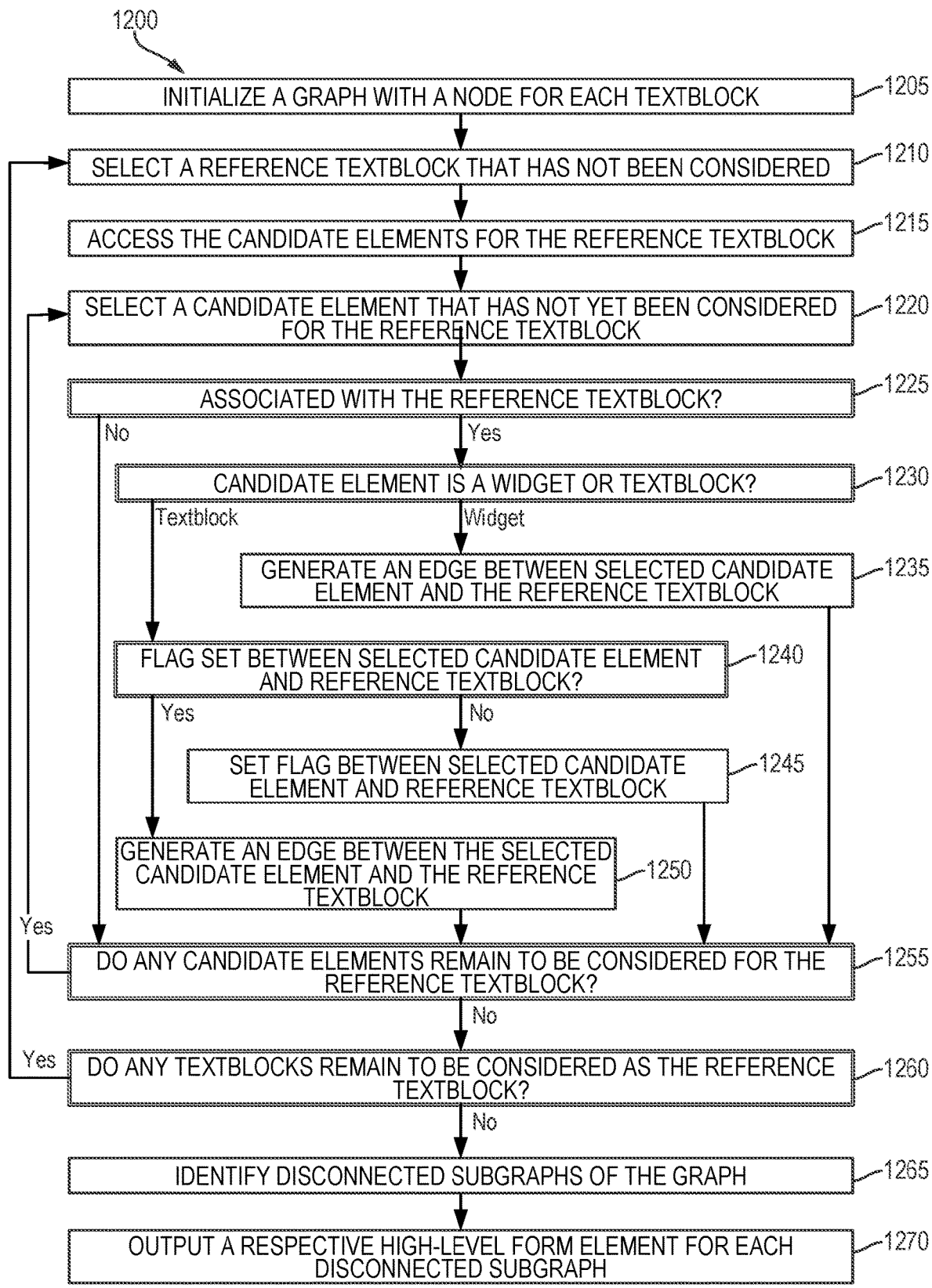
FIG. 12 is a diagram of an example of a process of using a graph to determine high-level form elements based on association predictions for textblocks, according to some embodiments described herein.

Throughout the above processes, each textblock 310 acts as the reference textblock 310 and potentially acts as a candidate element for one or more other textblocks 310. In some embodiments, the association subsystem 660b of the second analytics engine 145 determines high-level form elements based on the prediction associations made for each textblock 310 (i.e., for each reference textblock 310). For instance, the association subsystem 660b determines that two textblocks 310, a first textblock 310 and a second textblock 310, belong in the same high-level form element if (e.g., if and only if) (a) the first textblock 310 was deemed associated with the second textblock 310 with the second textblock as the reference textblock 310 and the first textblock as a candidate element and (b) the second textblock 310 was deemed associated with the first textblock 310 with the first textblock 310 as the reference textblock 310 and the second textblock 310 as a candidate element. In some embodiments, this condition can be met only if the second textblock 310 was a candidate element (i.e., was a nearby form element) for the first textblock 310 and if the first textblock 310 was a candidate element (i.e., was a nearby form element) for the second textblock 310. Further, an embodiment of the association subsystem 660b includes in a high-level form element each additional textblocks 310, if any, that share such a relationship with the first textblock 310 or with the second textblock 310. Additionally, an embodiment includes a widget 220 in a high-level form element with each textblock 310 for which the widget was a candidate element and with which the widget 220 was deemed associated. Thus, in some embodiments, the association subsystem 660b groups textblocks 310 and widgets 220 into high-level form elements such that any pair of textblocks 310 meeting the above criteria, in which each is deemed associated with the other, are placed in the same high-level form element along with widgets 220 deemed associated with one or more of such textblocks 310. Various techniques may be used based on the association predictions to identify high-level form elements using this criteria; FIG. 12 illustrates a process 1200 of utilizing one of such techniques.

FIG. 12 is a diagram of an example of a process 1200 of using a graph to determine high-level form elements based on association predictions for textblocks 310, according to some embodiments described herein. An embodiment of the association subsystem 660b uses this process 1200 or similar after having determined association predictions for each textblock 310 (i.e., for each reference textblock 310). Although FIG. 12 depicts various activities occurring in a particular sequence or order, this is not intended to be limiting. In certain embodiments, for instance, the activities may be performed in a different order, or one or more activities of the process 1200 may be performed in parallel. In certain embodiments, the process 1200 may be performed by the extraction system 100.

As shown in FIG. 12, at block 1205, the process 1200 involves initializing a graph and initializing other variables to be used in this process 1200. In some embodiments, the graph includes a respective node for each textblock 310 and for each widget 220. An embodiment of the association subsystem 660b initializes the graph no edges in the graph.

In one example, each pair of textblocks 310 represented by a pair of nodes is associated with a flag, which can potentially be set to either FALSE or TRUE. If the flag is set to TRUE, the corresponding pair of textblocks 310 is deemed flagged or deemed to have its flag set. During initialization, each flag can be initially established to a value of FALSE, such that no flags are initially TRUE or deemed to be set. Further, in some embodiments, because the graph is undirected, each pair of textblocks 310 associated with a flag is an unordered pair, such that the pair of Textblock A and Textblock B is the same as the pair of Textblock B and Textblock A. Thus, only a single flag is associated with a given combination of two textblocks 310, and only a single edge can exist at a time for that pair.

Block 1210 begins an iterative loop such that each iteration of the loop corresponds to a particular textblock 310. Specifically, at block 1210, the process 1200 involves selecting from the textblocks 310 of the static form 120 a reference textblock 310 that has not been considered in this process 1200.

At block 1215, the process 1200 involves accessing the candidate elements for the reference textblock 310. In some embodiments, each candidate element is already assigned an association prediction with respect to the reference textblock 310. As described above, such association predictions were output by the second analytics engine 145 in some embodiments. Block 1220 begins an inner iterative loop in which a respective candidate element (e.g., a candidate textblock 310 or a candidate widget 220) is considered during each iteration. Specifically, at block 1220, the process 1200 involves selecting a candidate element that has not yet been considered for the reference textblock 310.

At decision block 1225, the process 1200 involves determining whether the selected candidate element is deemed associated with the reference textblock 310 according to the association prediction made for the selected candidate element with respect to the reference textblock 310. If the selected candidate element is deemed associated with the reference textblock 310, then the process 1200 proceeds to decision block 1230. However, if the candidate element is deemed not associated with the reference textblock 310 based on the applicable association prediction, then the process 1200 skips ahead to decision block 1255.

At decision block 1230, the process 1200 involves determined whether the selected candidate element is a widget 220 or a textblock 310. If the selected candidate element is a widget 220, then at block 1235, the process 1200 involves generating an edge between the nodes representing the reference textblock 310 and the widget 220 and then skipping ahead to decision block 1255. However, if the selected candidate element is a textblock 310, then the process 1200 skips ahead to decision block 1240.

At decision block 1240, the selected candidate element is a textblock 310, and the process 1200 involves determining whether the pair of the reference textblock 310 and the selected candidate element has a flag that is set. If the flag is not set, then at block 1245, the process 1200 involves setting the flag for the reference textblock 310 and the selected candidate element and then skipping ahead to decision block 1255. However, if the flag is set for this pair of textblocks 310, then at block 1250, the process 1200 involves generating an edge between the reference textblock 310 and the selected candidate element and then proceeding to decision block 1255.

At decision block 1255, regardless of whether the selected candidate element is deemed associated with the reference textblock 310, the process 1200 involves determining whether any candidate elements remain to be considered for the reference textblock 310. If such a candidate element remains, then the process 1200 returns to block 1220 to select another candidate element. However, if no more candidate elements remain for consideration with respect to the reference textblock 310, then the process 1200 continues to decision block 1260.

At decision block 1260, the process 1200 involves determining whether any textblocks 310 remain to be considered as a reference textblock 310. If such a textblock 310 remains, then the process 1200 returns to block 1210 to select another textblock 310 as the reference textblock 310. However, if no more textblocks 310 remain for consideration, then the process 1200 continues to block 1265.

At block 1265, the process 1200 involves identifying each disconnected subgraph of the graph. Generally, a disconnected subgraph is a graph that includes a set a nodes and edges, such that no edge connects a node in the disconnected subgraph to another node outside the disconnected subgraph. In other words, each disconnected subgraph is a self-contained group of nodes, representing a combination of textblocks 310 or widgets 220, and edges between pairs of such nodes. Various techniques exist for identifying disconnected subgraphs, and one or more of such techniques can be used by embodiments described herein. In some embodiments, for each disconnected subgraph, the association subsystem 660b defines a high-level form element to include each textblock 310 and each widget 220 represented by respective nodes in that disconnected subgraph. A disconnected subgraph can include one or multiple nodes, and thus a resulting high-level form element can include one or multiple textblocks 310 or widgets 220.

At block 1270, the process 1200 involves outputting a set of high-level form elements, including a respective high-level form element corresponding to each disconnected subgraph. For instance, for each disconnected subgraph, an embodiment of the association subsystem 660b outputs an indication of the set of textblocks 310 or widgets 220, or both, represented by nodes in the disconnected subgraph.

In some embodiments, before the second analytics engine 145 is used in operation to determine high-level form elements based on textblocks 310 and widgets 220, some embodiments of the training system 160 train the second analytics engine 145 and, specifically, the one or more prediction models of the second analytics engine 145 to perform the task of determining high-level form elements based on textblocks 310 and widgets 220. More specifically, an embodiment trains the network of prediction models to associate a reference textblock 310 to other textblocks 310 and widgets 220 deemed nearby form elements and thus within a local image patch of the reference textblock 310 and, further, trains the network to determine that other textblocks 310 or widgets 220 are part of a shared form structure and to identify that form structure.

In some embodiments, the training system 160 trains the prediction models of the second analytics engine 145, such as the IE 610b, the TE 620b, the CE 630b, the FM 640b, and the SAM 650b, in an end-to-end manner. In other words, the prediction models are trained in a manner such that the prediction models have with one another the same relationship that they have during operation. For instance, each sample of training data used to train the prediction models is an input data subset corresponding to a sample textblock 310, such that the input data subset is used through the various prediction models during training. In some embodiments, the training data includes multiple training samples, and each training sample includes data related a particular textblock 310 as a reference textblock 310. For instance, a training sample includes a sequence of image patches $im^p = \{im_1^p, im_2^p, \ldots, im_{k_1+k_2}^p\}$, a sequence of text contents $t^a = \{t_1^a, t_2^a, \ldots, t_{k_1+k_2}^a\}$, and a sequence of normalized bounding boxes $bb^n = \{bb_1^n, bb_2^n, \ldots, bb_{k_1+k_2}^n\}$.

In some embodiments, given a choice group Chgp, a reference textblock $e_r$, and a candidate element $e_c$ for the reference textblock 310, the following are set: $e_r^{CGT}=1$ if $e_r$ is a title of the choice group; $e_r^{CFC}=1$ if $e_r$ is a caption of a choice field in the choice group; $e_c^{CGT}=1$ if $e_c$ is a title of the choice group; $e_c^{CFC}=1$ if $e_c$ is a caption of a choice field in the choice group; and $e_c^{CW}=1$ if $e_c$ is a widget of a choice field in the choice group and $e_r$ is a caption of the same choice field. Otherwise, each of $e_r^{CGT}$, $e_r^{CFC}$, $e_c^{CGT}$, $e_c^{CFC}$, and $e_c^{CW}$ is set to 0. In that case, the training label $label_r^c$ has the following value:

$$label_r^c = \begin{cases} 1 & \text{if } e_r^{CGT} = 1 \text{ and } e_c^{CFC} = 1 \\ 1 & \text{if } e_r^{CFC} = 1 \text{ and } e_c^{CGT} = 1 \\ 1 & \text{if } e_r^{CFC} = 1 \text{ and } e_c^{CW} = 1 \\ 1 & \text{if } e_r^{CFC} = 1 \text{ and } e_c^{CFC} = 1 \\ 0 & \text{otherwise} \end{cases}$$

In some embodiments, these labels are created selectively in this manner because associating a choice group title with widgets 220 of its choice fields could confuse the network of prediction models in the second analytics engine 145.

In some embodiments, the training system 160 computes cross entropy loss (CE loss) over field classification predicted by the auxiliary branch of the IE, $CE_{conv}^{Field}$, and sequential predictions made by the SAM, $CE_{seq}^{Field}$, as well as computing binary cross entropy loss over choice group associations predicted by the IE, $BCE_{conv}^{Chgp}$, and by the SAM, $BCE_{seq}^{Chgp}$, to train the network. Thus, in some embodiments, total loss for the network of prediction models in the second analytics engine 145 is computed as follows:

$$loss_2 = CE_{conv}^{Field} + CE_{seq}^{Field} + BCE_{conv}^{Chgp} + BCE_{seq}^{Chgp}$$

An embodiment of the training system 160 trains the network of prediction models on tagged textblocks 310 and tagged widgets 220. During inference, the training system 160 uses the textblocks 310 predicted by the network with ground truth widgets 220 as input for evaluation.

In some embodiments, during training, the training system 160 has access to ground truth labels, which indicate actual groupings of low-level form elements into high-level form elements. The prediction models of the first analytics engine 140 and the second analytics engine 145 are trained based on using the applicable loss functions to compare predicted high-level form elements (i.e., as predicted by the first analytics engine 140 and the second analytics engine 145) and tagged high-level form elements (i.e., as indicated by the ground truth labels). For example, a predicted high-level form element may be deemed the same as a tagged high-level form element if and only if the two includes the same textruns 210 and widgets 220. Further, some embodiments use ground truth labels as previous step prediction input for the SAM 650b during training and use the actual prediction of the SAM 650b during inference following a standard teacher forcing technique.

The requirement for a prediction of a high-level form element to be deemed accurate is stricter than requirements used in training prediction models in existing segmentation techniques. For instance, existing segmentation techniques deem a prediction accurate based on an overlap ratio a prediction and ground truth. Thus, some embodiment described herein can provide more accurate models.

As discussed above, the form-generation subsystem 150 generates a reflowable form 110 based on the static form 120. In some embodiments, for instance, the form-generation subsystem 150 generates the reflowable form 110 with metadata that links together the various form elements, such as widgets 220 and textruns 210, that make up a high-level form element. Thus, when the reflowable form 110 is accessed and read by a computing device that supports the reflowable capability of the reflowable form 110, the computing device maintains a spatial relationship among form elements within a high-level form element to ensure that such form elements remain together.

Figure 13:
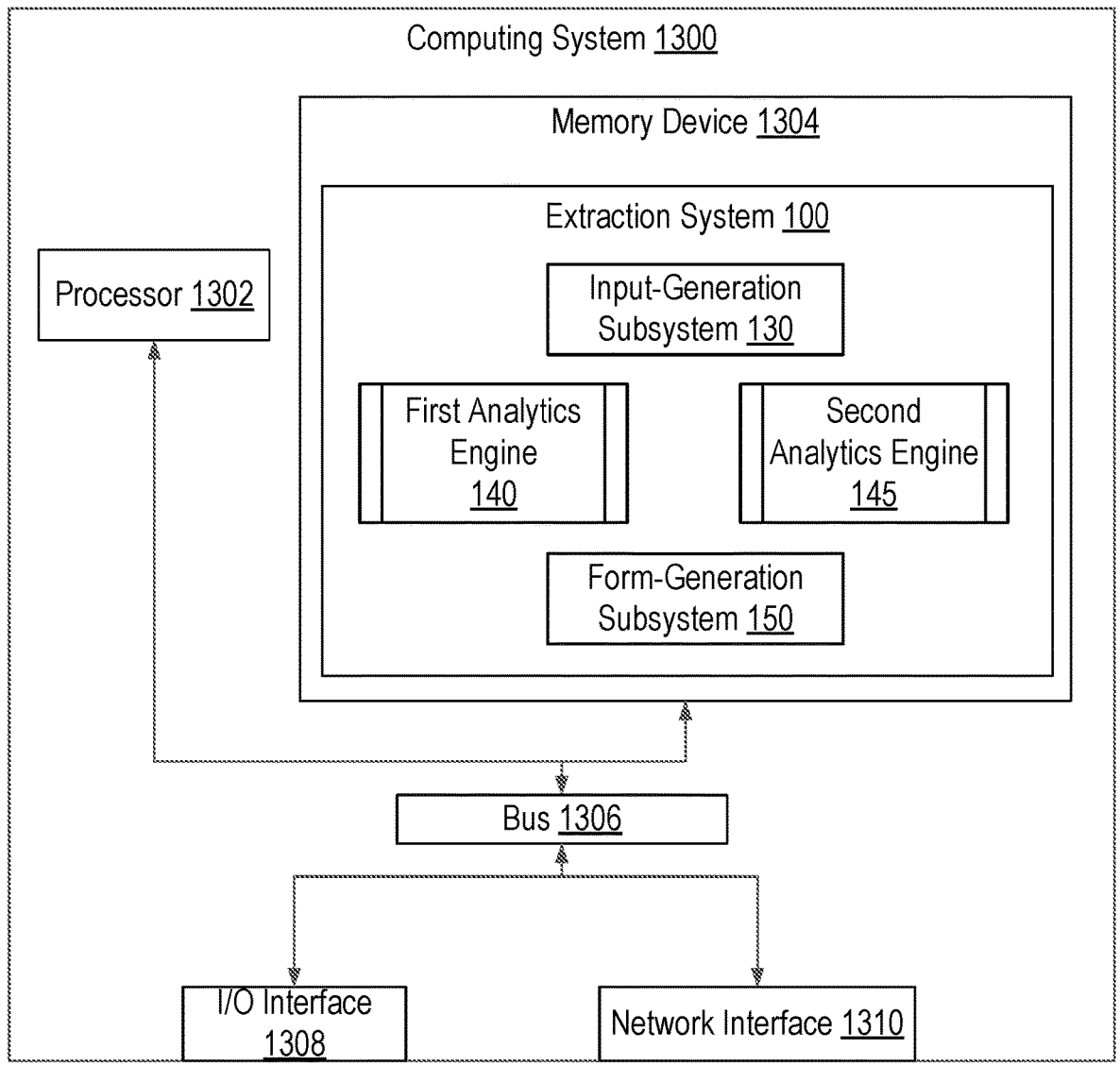
FIG. 13 is a diagram of an example of a computing system that performs certain operations of the extraction system, according to some embodiments described herein.

FIG. 13 is a diagram of an example of a computing system 1300 that performs certain operations described herein, according to certain embodiments. Any suitable computing system or group of computing systems can be used for performing the operations described herein. For example, FIG. 13 depicts an example of a computing system 1300 that executes the input-generation subsystem 130, the first analytics engine 140, the second analytics engine 145, and the form-generation subsystem 150, which are together configured to determine high-level form elements using machine learning in the extraction system 100. In some embodiments, the computing system 1300 also executes the training system 160, although not depicted in FIG. 13. In other embodiments, as in the example of FIG. 13, a separate computing system having devices similar to those depicted in FIG. 13 (e.g., a processor, a memory, etc.) executes the training system 160.

The depicted example of the computing system 1300 includes a processor 1302 communicatively coupled to one or more memory devices 1304. The processor 1302 executes computer-executable program code stored in a memory device 1304, accesses information stored in the memory device 1304, or both. Examples of the processor 1302 include a microprocessor, an application-specific integrated circuit ("ASIC"), a field-programmable gate array ("FPGA"), or any other suitable processing device. The processor 1302 can include any number of processing devices, including a single processing device.

The memory device 1304 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1300 may also include a number of external or internal devices, such as input or output devices. For example, the computing system 1300 is shown with one or more input/output ("I/O") interfaces 1308. An I/O interface 1308 can receive input from input devices or provide output to output devices. One or more buses 1306 are also included in the computing system 1300. The bus 1306 communicatively couples one or more components of a respective one of the computing system 1300.

The computing system 1300 executes program code that configures the processor 1302 to perform one or more of the operations described herein. The program code includes, for example, the input-generation subsystem 130, the first analytics engine 140, the second analytics engine 145, the form-generation subsystem 150, or other suitable applications that perform one or more operations described herein. The program code may be resident in the memory device 1304 or any suitable computer-readable medium and may be executed by the processor 1302 or any other suitable processor. In some embodiments, the training system 160 is executed remotely and, as shown, is thus not stored in the memory device 1304. In additional or alternative embodiments, however, the training system 160 is executed on the computing system 1300 and is stored in the memory device 1304 or other suitable computer-readable medium on the computing system 1300. In additional or alternative embodiments, the program code described above is stored in one or more other memory devices accessible via a data network.

The computing system 1300 can access one or more of the input-generation subsystem 130, the first analytics engine 140, the second analytics engine 145, and the form-generation subsystem 150 in any suitable manner. In some embodiments, some or all of one or more of these data sets, models, and functions are stored in the memory device 1304, as in the example depicted in FIG. 13. Further, for example, an alternative computing system that executes the training system 160 or other components needed by the extraction system 100 can provide access to the extraction system 100 via a data network.

The computing system 1300 also includes a network interface device 1310. The network interface device 1310 includes any device or group of devices suitable for establishing a wired or wireless data connection to one or more data networks. Non-limiting examples of the network interface device 1310 include an Ethernet network adapter, a modem, and the like. The computing system 1300 is able to communicate with one or more other computing devices (e.g., a computing device executing the training system 160) via a data network using the network interface device 1310.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
accessing low-level form elements extracted from a static form;
identifying candidate low-level form elements, of the low-level form elements, that are co-located with a reference low-level form element in a portion of the static form;
generating, for the reference low-level form element, image patches comprising a respective image patch representing each candidate low-level form element corresponding to the reference low-level form element;
determining, using a first set of prediction models trained to determine associations between the low-level form elements, a second-level form element based on the generated image patches, wherein the second-level form element comprises the reference low-level form element and one or more of the candidate low-level form elements as a subset of the second-level form element;
determining, using a second set of prediction models trained to determine associations in the second-level form element and the low-level form elements, a high-level form element based on the second-level form element, wherein the high-level form element comprises the second-level form element and one or more other form elements as a subset of the high-level form element; and
generating a reflowable form using a hierarchy of form elements based on the static form by: i) linking the reference low-level form element and the one or more of the candidate low-level form elements that are a subset of the second-level form element; and (ii) linking together the second-level form element and the one or more other form elements that are a subset of the second-level form element.

2. The method of claim 1, further comprising:
generating input data describing the low-level form elements, wherein generating the input data comprises, for the reference low-level form element, generating the image patches as a first sequence of image patches corresponding to a portion of the static form in which the reference low-level form element appears; and
inputting the input data to the first set of prediction models.

3. The method of claim 2, further comprising:
generating additional input data describing second-level form elements and the low-level form elements, wherein generating the additional input data comprises, for the second-level form element, generating a second sequence of image patches corresponding to a portion of the static form in which the second-level form element appears; and
inputting the additional input data to the second set of prediction models.

4. The method of claim 1, wherein determining the second-level form element comprises:
generating a first graph comprising a first set of nodes, the first set of nodes comprising a respective node for each textrun in the low-level form elements;
adding to the first graph an edge between a first node and a second node of the first set of nodes, wherein the first node and the second node are deemed associated with each other based on output of the first set of prediction models;
determining a first disconnected subgraph in the first graph; and
grouping the low-level form elements into textblocks based on nodes in the first disconnected subgraph.

5. The method of claim 4, wherein determining the high-level form element comprises:
generating a second graph comprising a set of second-level nodes, the set of second-level nodes comprising a respective node for each textblock;
adding to the second graph a second-level edge between a first second-level node and a second second-level node of the set of second-level nodes, wherein the first second-level node and the second second-level node are deemed associated with each other based on output of the second set of prediction models;
determining a second disconnected subgraph in the second graph; and grouping the second-level form element and the one or more other form elements into the high-level form element based on nodes in the second disconnected subgraph.

6. The method of claim 1, wherein each prediction model in the first set of prediction models shares a respective common architecture with a corresponding prediction model in the second set of prediction models.

7. The method of claim 1, wherein the first set of prediction models comprises at least one of an image encoder, a text encoder, a context encoder, a fusion model, or a sequential association model.

8. The method of claim 7, wherein:
the first set of prediction models comprises a first image encoder, a first text encoder, a first context encoder, a first fusion model, and a first sequential association model;
the second set of prediction models comprises a second image encoder, a second text encoder, a second context encoder, a second fusion model, and a second sequential association model; and
the second set of prediction models are trained separately from the first set of prediction models.

9. The method of claim 1, wherein the second set of prediction models comprises a sequential association model configured to classify the high-level form element into a selection of three or more classes of high-level form elements.

10. A system comprising:
a memory component storing program code;
a computer processor configured to execute the program code to provide:
an input-generation subsystem configured to:
access low-level form elements extracted from a static form;
identify candidate low-level form elements, of the low-level form elements, that are co-located with a reference low-level form element in a portion of the static form; and
generate, for the low-level form element, image patches comprising a respective image patch representing each candidate low-level form element corresponding to the reference low-level form element;
a first set of prediction models configured to analyze input data comprising the image patches to determine a second-level form element, the second-level form element comprising the reference low-level form element and one or more of the candidate low-level form elements as a subset of the second-level form element, wherein the first set of prediction models is trained to determine associations between the low-level form elements;
a second set of prediction models configured to determine a high-level form element based on the second-level form element and the low-level form elements, the high-level form element comprising the second-level form element and one or more other form elements as a subset of the high-level form element, wherein the second set of prediction models is trained to determine associations between the second-level form element and the low-level form elements; and
a form-generation subsystem configured to generate a reflowable form using a hierarchy of form elements based on the static form by: (i) linking together the reference low-level form element and the one or more of the candidate low-level form elements that are a subset of the second-level form element and (ii) linking together the second-level form element and the one or more other form elements that are a subset of the high-level form element.

11. The system of claim 10, wherein the form-generation subsystem is configured to generate the reflowable form by, for each particular high-level form element of a set high-level form elements, linking together respective one or more second-level form elements or low-level form elements that are a subset of the particular high-level form element.

12. The system of claim 10, the input-generation subsystem further configured to generate additional input data describing second-level form elements and the low-level form elements, wherein generating the additional input data comprises, for the second-level form element, generating a second sequence of image patches corresponding to a portion of the static form in which the second-level form element appears.

13. The system of claim 10, wherein each prediction model in the first set of prediction models shares a respective common architecture with a corresponding prediction model in the second set of prediction models.

14. The system of claim 10, wherein:
the first set of prediction models comprises a first image encoder, a first text encoder, a first context encoder, a first fusion model, and a first sequential association model;
the second set of prediction models comprises a second image encoder, a second text encoder, a second context encoder, a second fusion model, and a second sequential association model; and
the second set of prediction models are trained separately from the first set of prediction models.

15. The system of claim 10, wherein:
the first set of prediction models comprises a first sequential association model configured to implement a binary classifier to classify second-level form elements including the second-level form element; and
the second set of prediction models comprises a second sequential association model configured to classify high-level form elements, including the high-level form element, into three or more classes of high-level form elements.

16. A non-transitory computer-readable medium storing executable instructions, which when executed by a processing device, cause the processing device to perform operations comprising:
accessing low-level form elements extracted from a static form;
identifying candidate low-level form elements, of the low-level form elements, that are co-located with a reference low-level form element in a portion of the static form;
generating, for the reference low-level form element, image patches comprising a respective image patch representing each candidate low-level form element corresponding to the reference low-level form element;
determining, using a first set of prediction models trained to determine associations between the low-level form elements, a second-level form element based on the generated image patches, wherein the second-level form element comprises the reference low-level form element and one or more of the candidate low-level form elements as a subset of the second-level form element;

determining, using a second set of prediction models trained to determine associations in the second-level form element and the low-level form elements, a high-level form element based on the second-level form element, wherein the high-level form element comprises the second-level form element and one or more other form elements as a subset of the high-level form element; and generating a reflowable form using a hierarchy of form elements based on the static form by: (i) linking the reference low-level form element and the one or more of the candidate low-level form elements that are a subset of the second-level form element; and (ii) linking together the second-level form element and the one or more other form elements that are a subset of the second-level form element.

17. The non-transitory computer-readable medium of claim 16, further comprising:

generating input data describing second-level form elements and the low-level form elements, wherein generating the input data comprises, for the second-level form element, generating a second sequence of image patches corresponding to a portion of the static form in which the second-level form element appears; and inputting the input data to the second set of prediction models.

18. The non-transitory computer-readable medium of claim 16, wherein determining the second-level form element comprises:

generating a first graph comprising a first set of nodes, the first set of nodes comprising a respective node for each textrun in the low-level form elements;

adding to the first graph an edge between a first node and a second node, in the first set of nodes, deemed associated with each other based on output of the first set of prediction models;

determining a first disconnected subgraph in the first graph; and grouping the low-level form elements into textblocks based on nodes in the first disconnected subgraph.

19. The non-transitory computer-readable medium of claim 18, wherein determining the high-level form element comprises:

generating a second graph comprising a set of second-level nodes, the set of second-level nodes comprising a respective node for each textblock;

adding to the second graph a second-level edge between a first second-level node and a second second-level node, in the set of second-level nodes, deemed associated with each other based on output of the second set of prediction models;

determining a second disconnected subgraph in the second graph; and grouping the second-level form element and the one or more other form elements into the high-level form element based on nodes in the second disconnected subgraph.

* * * * *